United States Patent
Kim

(10) Patent No.: US 11,013,359 B2
(45) Date of Patent: May 25, 2021

(54) DRIP CONTAINER AND PORTABLE COFFEE DRINKING CONTAINER

(71) Applicant: INNODESIGN CO., LTD, Seoul (KR)

(72) Inventor: Young Se Kim, Seoul (KR)

(73) Assignee: INNODESIGN CO., LTD, Seoul (KR)

( * ) Notice: Subject to any disclaimer, the term of this patent is extended or adjusted under 35 U.S.C. 154(b) by 0 days.

(21) Appl. No.: 16/967,126

(22) PCT Filed: Feb. 1, 2019

(86) PCT No.: PCT/KR2019/001481
§ 371 (c)(1),
(2) Date: Aug. 3, 2020

(87) PCT Pub. No.: WO2019/151837
PCT Pub. Date: Aug. 8, 2019

(65) Prior Publication Data
US 2021/0030190 A1 Feb. 4, 2021

(30) Foreign Application Priority Data
Feb. 5, 2018 (KR) ........................ 10-2018-0013951

(51) Int. Cl.
| | | |
|---|---|---|
| A47J 31/06 | (2006.01) | |
| A47J 31/44 | (2006.01) | |
| A47J 31/00 | (2006.01) | |

(52) U.S. Cl.
CPC ......... *A47J 31/0626* (2013.01); *A47J 31/005* (2013.01); *A47J 31/4403* (2013.01)

(58) Field of Classification Search
CPC ... A47J 31/0626; A47J 31/005; A47J 31/4403
(Continued)

(56) References Cited

U.S. PATENT DOCUMENTS

| | | | | |
|---|---|---|---|---|
| 316,885 A | * | 4/1885 | Dumont | B01D 24/004 210/284 |
| 323,637 A | * | 8/1885 | Connolly | B01D 17/045 210/300 |

(Continued)

FOREIGN PATENT DOCUMENTS

| | | |
|---|---|---|
| JP | 06343558 | 12/1994 |
| JP | 6343558 | 12/1994 |

(Continued)

OTHER PUBLICATIONS

International Search Report issued in connection with PCT/KR2019/001481 dated May 10, 2019.

(Continued)

*Primary Examiner* — Jimmy Chou
(74) *Attorney, Agent, or Firm* — Steven M. Shape; Dennemeyer & Associates, LLC

(57) ABSTRACT

According to an embodiment of the present invention, there is provided a drip container including: a first main body providing a first space for dripping in which coffee grounds are stored, including an outlet hole through which drip coffee made by dripping discharges into a second space, and including an outward protrusion that protrudes outward from a region of an outer wall defining the first space; a cover surrounding the first main body so that the first main body is protected; a first opening and closing part detachably engaged with the cover so that opening and closing of the first space are adjusted; an inflow part including an inlet hole through which the drip coffee discharging through the outlet hole flows into the second space; and an elastic part elastically deformed due to pressure applied by the outward protrusion when the first opening and closing part is engaged, and placed between the first main body and the cover so that restoring force acts on the outward protrusion, wherein a position of the first main body is changed by (Continued)

interaction between the first opening and closing part and the elastic part, thereby adjusting communication between the outlet hole and the inlet hole.

13 Claims, 20 Drawing Sheets

(58) Field of Classification Search
USPC ............ 99/282, 283, 289 R, 289 P, 298, 323
See application file for complete search history.

(56) References Cited

U.S. PATENT DOCUMENTS

| | | | | | |
|---|---|---|---|---|---|
| 347,581 | A | * | 8/1886 | Dodge | A01J 11/06 210/337 |
| 426,489 | A | * | 4/1890 | Connolly | B01D 24/26 210/337 |
| 433,659 | A | * | 8/1890 | Schermerhorn | A01J 11/06 210/315 |
| 604,984 | A | * | 5/1898 | Harder | C02F 1/001 210/318 |
| 881,564 | A | * | 3/1908 | Epstein | A47J 31/0636 210/337 |
| 942,121 | A | * | 12/1909 | White | B01D 29/03 210/314 |
| 950,211 | A | * | 2/1910 | Reymore | A01J 9/02 210/314 |
| 967,905 | A | * | 8/1910 | Hagg | B01D 17/045 210/301 |
| 989,752 | A | * | 4/1911 | Ansley | A01J 1/00 210/318 |
| 1,023,664 | A | * | 4/1912 | Laity | A01J 11/06 210/337 |
| 1,044,074 | A | * | 11/1912 | Nugent | B01D 35/18 210/329 |
| 1,053,573 | A | * | 2/1913 | Clemm | B01D 35/28 210/315 |
| 1,068,900 | A | * | 7/1913 | Herd | A01J 1/00 210/470 |
| 1,104,773 | A | * | 7/1914 | Bradshaw | A01J 9/02 210/318 |
| 1,216,112 | A | * | 2/1917 | Greven | A47J 31/06 210/477 |
| 1,317,717 | A | * | 10/1919 | McKenney | A47J 31/02 99/299 |
| 1,501,073 | A | * | 7/1924 | Moore | B01D 29/085 210/478 |
| 1,536,890 | A | * | 5/1925 | Lagemann | A01J 9/02 210/249 |
| 1,601,987 | A | * | 10/1926 | Topper | A47J 31/06 99/306 |
| 1,701,194 | A | * | 2/1929 | Rosenstein | A47J 31/02 99/285 |
| 1,876,474 | A | * | 9/1932 | Starkey | B65D 85/8043 99/295 |
| 1,889,111 | A | * | 11/1932 | Serr | B65D 85/816 206/217 |
| 1,895,857 | A | * | 1/1933 | Mockbee | A47J 31/053 99/299 |
| 2,000,309 | A | * | 5/1935 | Wentorf | A47J 31/02 99/306 |
| 2,003,658 | A | * | 6/1935 | Lawrence | A01J 11/06 210/318 |
| 2,069,229 | A | * | 2/1937 | Ferris | A47J 31/02 99/299 |
| 2,285,114 | A | * | 6/1942 | Ferris | A47J 31/02 99/283 |
| 3,010,583 | A | * | 11/1961 | Kenyon | G01N 1/2035 210/406 |
| 3,083,101 | A | * | 3/1963 | Noury | B65D 85/8043 99/295 |
| 3,420,675 | A | * | 1/1969 | Costas | B65D 85/8043 426/77 |
| 3,694,235 | A | * | 9/1972 | Siegel | B65D 85/816 426/78 |
| 3,695,168 | A | * | 10/1972 | Van Brunt | A47J 31/02 99/306 |
| 3,924,741 | A | * | 12/1975 | Kachur | B65D 51/2892 206/221 |
| 3,931,756 | A | * | 1/1976 | Van Brunt | A47J 31/02 99/306 |
| 3,937,134 | A | * | 2/1976 | Molenaar | A47J 31/02 99/295 |
| 3,971,305 | A | * | 7/1976 | Daswick | A47J 31/02 99/295 |
| 3,985,069 | A | * | 10/1976 | Cavalluzzi | A47J 31/02 99/295 |
| 4,021,354 | A | * | 5/1977 | Lyon | B01D 29/055 210/477 |
| 4,167,136 | A | * | 9/1979 | Chupurdy | A47J 31/02 99/306 |
| 4,251,366 | A | * | 2/1981 | Simon | B01L 3/565 210/406 |
| 4,255,265 | A | * | 3/1981 | Greutert | A47J 31/0621 210/474 |
| 4,256,585 | A | * | 3/1981 | Greutert | A47J 31/0605 210/474 |
| 4,301,010 | A | * | 11/1981 | Eddleman | B01D 29/085 210/406 |
| 4,354,427 | A | * | 10/1982 | Filipowicz | A47J 31/0573 99/295 |
| 4,357,240 | A | * | 11/1982 | Mehra | B01D 29/05 210/455 |
| 4,417,504 | A | * | 11/1983 | Yamamoto | A47J 31/02 206/0.5 |
| 4,439,319 | A | * | 3/1984 | Rock | B01D 29/96 210/238 |
| 4,446,158 | A | * | 5/1984 | English | B65D 85/8043 426/77 |
| 4,520,716 | A | * | 6/1985 | Hayes | A47J 31/02 99/295 |
| 4,577,080 | A | * | 3/1986 | Grossman | A47J 31/547 219/689 |
| 4,614,585 | A | * | 9/1986 | Mehra | B01D 29/012 210/321.84 |
| 4,642,443 | A | * | 2/1987 | Jorgensen | A47J 31/053 219/689 |
| 4,644,856 | A | * | 2/1987 | Borgmann | A47J 31/4464 210/455 |
| 4,673,501 | A | * | 6/1987 | Wells | B01D 29/03 210/406 |
| 4,689,147 | A | * | 8/1987 | Leoncavallo | B01D 35/30 210/232 |
| 4,702,834 | A | * | 10/1987 | Relyea | B01D 29/012 210/321.78 |
| 4,731,177 | A | * | 3/1988 | Hemman | B01D 29/03 210/86 |
| 4,783,318 | A | * | 11/1988 | Lapakko | B01D 11/0219 210/258 |
| 4,806,369 | A | * | 2/1989 | Thompson | A47G 19/16 206/15 |
| 4,833,979 | A | * | 5/1989 | Garulli | A47J 31/40 99/287 |
| 4,843,954 | A | * | 7/1989 | Henn | A47J 31/047 99/292 |
| 4,882,982 | A | * | 11/1989 | Muttoni | A47J 31/0605 99/295 |
| 4,894,155 | A | * | 1/1990 | Leoncavallo | B01D 29/41 210/321.84 |
| 4,997,015 | A | * | 3/1991 | Johnson | A47J 31/061 141/302 |
| 5,067,395 | A | * | 11/1991 | Timm | A47J 36/2466 99/282 |
| 5,186,828 | A | * | 2/1993 | Mankin | B01D 29/27 210/232 |
| 5,192,424 | A | * | 3/1993 | Beyne | B01D 29/23 210/232 |

(56) References Cited

U.S. PATENT DOCUMENTS

| | | | | |
|---|---|---|---|---|
| 5,234,585 A * | 8/1993 | Zuk, Jr. | B01D 29/05 | 210/188 |
| 5,243,164 A * | 9/1993 | Erickson | A47J 31/02 | 219/689 |
| 5,259,295 A * | 11/1993 | Timm | A47J 31/005 | 99/282 |
| 5,309,823 A * | 5/1994 | Allen | A47J 31/053 | 426/433 |
| 5,318,703 A * | 6/1994 | Heiligman | A47J 31/605 | 210/264 |
| 5,325,996 A * | 7/1994 | Bannigan | A47G 19/12 | 222/129 |
| 5,353,961 A * | 10/1994 | Debush | B65D 25/08 | 206/221 |
| 5,393,548 A * | 2/1995 | Heiligman | A47J 31/605 | 210/264 |
| 5,411,661 A * | 5/1995 | Heiligman | A47J 31/605 | 210/264 |
| 5,433,328 A * | 7/1995 | Baron | A61J 1/2093 | 215/11.4 |
| 5,490,927 A * | 2/1996 | Herczeg | B01D 61/18 | 210/321.75 |
| 5,590,581 A * | 1/1997 | Strub | A47J 31/0663 | 99/295 |
| 5,603,900 A * | 2/1997 | Clark | B01D 29/012 | 422/535 |
| 5,632,193 A * | 5/1997 | Shen | A47J 31/02 | 99/285 |
| 5,632,194 A * | 5/1997 | Lin | A47J 31/02 | 99/285 |
| 5,638,968 A * | 6/1997 | Baron | A61J 9/00 | 206/221 |
| 5,652,008 A * | 7/1997 | Heiligman | C02F 1/003 | 210/263 |
| D381,866 S * | 8/1997 | St-Gelais | D7/300 | |
| 5,699,719 A * | 12/1997 | Lucas | A47J 31/061 | 215/13.1 |
| 5,725,765 A * | 3/1998 | Shen | A47J 31/02 | 210/238 |
| 5,775,206 A * | 7/1998 | St-Gelais | A47J 31/02 | 99/295 |
| 5,813,317 A * | 9/1998 | Chang | A47J 31/02 | 210/238 |
| 5,826,493 A * | 10/1998 | Tien Lin | A47J 31/02 | 99/306 |
| 5,832,809 A * | 11/1998 | Gras | A47J 31/106 | 99/299 |
| 5,853,581 A * | 12/1998 | Rayborn | A47J 43/24 | 210/241 |
| 5,855,160 A * | 1/1999 | Shen | A47G 19/14 | 99/279 |
| 5,862,739 A * | 1/1999 | Lin | A47J 31/02 | 99/285 |
| 5,914,045 A * | 6/1999 | Palmer | C02F 1/003 | 210/136 |
| 5,943,946 A * | 8/1999 | Chen | A47J 31/20 | 99/297 |
| 5,947,004 A * | 9/1999 | Huang | A47J 31/0615 | 99/299 |
| 5,948,246 A * | 9/1999 | Zuk, Jr. | B01D 29/05 | 210/188 |
| 6,045,254 A * | 4/2000 | Inbar | A61J 9/00 | 366/130 |
| 6,058,827 A * | 5/2000 | Lin Tien | A47J 31/061 | 99/299 |
| 6,069,996 A * | 5/2000 | Timm | A47J 31/106 | 392/444 |
| 6,103,116 A * | 8/2000 | Koslow | A47J 31/06 | 210/282 |
| 6,164,190 A * | 12/2000 | Tien Lin | A47J 31/061 | 99/299 |
| 6,182,554 B1 * | 2/2001 | Beaulieu | A47J 31/3628 | 99/289 R |
| 6,276,262 B1 * | 8/2001 | Chen | A23F 3/18 | 426/435 |
| 6,327,965 B1 * | 12/2001 | Lin Tien | A47J 31/02 | 99/299 |
| 6,358,730 B1 * | 3/2002 | Kane | C12M 23/10 | 422/504 |
| 6,477,942 B1 * | 11/2002 | Guu | A47J 31/0605 | 99/285 |
| 6,481,337 B1 * | 11/2002 | Guu | A47J 31/005 | 99/285 |
| 6,494,128 B1 * | 12/2002 | Yu | A47J 31/0605 | 99/285 |
| 6,805,040 B1 * | 10/2004 | Chang | A47J 31/02 | 99/285 |
| 6,913,152 B2 * | 7/2005 | Zuk, Jr. | B01D 29/05 | 210/406 |
| 7,073,428 B2 * | 7/2006 | Chung | A47J 31/0615 | 99/283 |
| 7,150,219 B2 * | 12/2006 | De'Longhi | A47J 31/0663 | 99/299 |
| 7,182,864 B2 * | 2/2007 | Brown | B01D 29/21 | 210/232 |
| 7,661,538 B1 * | 2/2010 | Zuk, Jr. | B01D 29/05 | 210/416.1 |
| 7,670,479 B2 * | 3/2010 | Arett | A47G 19/12 | 210/85 |
| 7,798,333 B2 * | 9/2010 | Zuk, Jr. | G01N 1/4077 | 210/406 |
| 7,836,820 B2 * | 11/2010 | Hammad | A47J 31/0605 | 99/299 |
| 7,856,922 B2 * | 12/2010 | Tjen | A47J 31/02 | 99/322 |
| 7,926,414 B1 * | 4/2011 | Wolcott | A47J 31/0615 | 99/279 |
| 8,039,036 B2 * | 10/2011 | Knitel | A47J 31/0647 | 426/595 |
| 8,158,009 B2 * | 4/2012 | Kane | B01D 29/05 | 210/739 |
| 8,318,011 B2 * | 11/2012 | O'Brien | C02F 1/002 | 210/200 |
| 8,342,337 B1 * | 1/2013 | Genovese | C02F 1/002 | 210/348 |
| 8,505,441 B2 * | 8/2013 | Bambi | A47J 31/002 | 99/302 R |
| 8,516,949 B2 * | 8/2013 | Chen | A47J 31/02 | 99/316 |
| 8,635,946 B2 * | 1/2014 | White | A47J 31/0621 | 99/299 |
| 8,757,049 B2 * | 6/2014 | Giessler | A47J 31/0615 | 99/306 |
| 8,808,552 B2 * | 8/2014 | Lin | B01D 29/085 | 210/808 |
| 8,875,753 B2 * | 11/2014 | Norris | A47G 21/00 | 141/333 |
| 9,055,836 B2 * | 6/2015 | Liu | A47J 31/005 | |
| 9,179,796 B2 * | 11/2015 | Krul | A47J 31/061 | |
| 9,332,875 B2 * | 5/2016 | White | A47J 31/4403 | |
| 9,521,923 B2 * | 12/2016 | Priley | A47J 31/407 | |
| 9,624,463 B2 * | 4/2017 | Wainwright | G01N 1/4077 | |
| 9,629,782 B2 * | 4/2017 | Hayes | A61J 11/04 | |
| 9,723,942 B2 * | 8/2017 | Do | A47J 31/0615 | |
| 9,795,240 B2 * | 10/2017 | Desjardin | A23N 1/02 | |
| 10,278,534 B2 * | 5/2019 | Miller | A47J 31/10 | |
| 10,470,602 B2 * | 11/2019 | Geissler | A47J 31/02 | |
| 2001/0009127 A1 * | 7/2001 | Timm | A47J 31/005 | 99/299 |
| 2004/0194631 A1 * | 10/2004 | Pope | A47J 31/56 | 99/279 |
| 2005/0189288 A1 * | 9/2005 | Hershberger | A61M 1/0094 | 210/448 |
| 2005/0189290 A1 * | 9/2005 | Maiden | C02F 1/003 | 210/473 |
| 2005/0242529 A1 * | 11/2005 | Kim | F25D 23/087 | 277/628 |

(56) References Cited

U.S. PATENT DOCUMENTS

| | | | | |
|---|---|---|---|---|
| 2005/0265903 | A1* | 12/2005 | Ross | B01D 53/0415 422/120 |
| 2009/0056557 | A1* | 3/2009 | Lin | A47J 31/02 99/323 |
| 2009/0101023 | A1* | 4/2009 | Kimura | A47J 37/1223 99/331 |
| 2009/0178573 | A1* | 7/2009 | Pan | A47J 31/20 99/323 |
| 2009/0199518 | A1* | 8/2009 | Deuber | A47J 31/3628 53/492 |
| 2009/0294385 | A1* | 12/2009 | Tajima | B01D 61/145 210/808 |
| 2010/0031827 | A1* | 2/2010 | Lai | A47J 31/02 99/306 |
| 2010/0212509 | A1* | 8/2010 | Tien | A47J 31/0605 99/305 |
| 2010/0224078 | A1* | 9/2010 | Khalifa | A47J 31/20 99/323 |
| 2011/0005400 | A1* | 1/2011 | Tien | A47J 31/02 99/298 |
| 2011/0271845 | A1* | 11/2011 | Lee | A47J 31/02 99/295 |
| 2011/0284442 | A1* | 11/2011 | Williams | B01D 29/58 210/170.09 |
| 2011/0303094 | A1* | 12/2011 | Lown | A47J 31/0605 99/299 |
| 2012/0024161 | A1* | 2/2012 | Chen | A47J 31/10 99/299 |
| 2012/0024162 | A1* | 2/2012 | Chen | A47J 31/0615 99/316 |
| 2012/0152865 | A1* | 6/2012 | Lin | B01D 29/085 210/808 |
| 2012/0186456 | A1* | 7/2012 | Kuempel | A47J 31/18 99/282 |
| 2012/0225176 | A1* | 9/2012 | DiStefano | A47J 31/18 426/435 |
| 2012/0241369 | A1* | 9/2012 | McLane | B01D 29/58 210/301 |
| 2013/0078342 | A1* | 3/2013 | Loebl | A23F 5/262 426/115 |
| 2013/0160655 | A1* | 6/2013 | Chen | A47J 31/0615 99/299 |
| 2013/0160656 | A1* | 6/2013 | Mccormick | A47J 31/061 99/299 |
| 2013/0167731 | A1* | 7/2013 | Eidenbenz | A47J 31/20 99/283 |
| 2014/0102306 | A1* | 4/2014 | White | A47J 31/4403 99/284 |
| 2014/0251153 | A1* | 9/2014 | Tien | A47J 31/4407 99/322 |
| 2015/0150406 | A1* | 6/2015 | Miller | A47J 31/10 99/298 |
| 2016/0345769 | A1* | 12/2016 | Clausen | B01F 11/0031 |
| 2018/0263404 | A1* | 9/2018 | Pisarevsky | A47J 31/0615 |

FOREIGN PATENT DOCUMENTS

| | | |
|---|---|---|
| JP | 06343558 A * | 12/1994 |
| JP | 4658935 B2 | 3/2011 |
| JP | 5105319 | 10/2012 |
| JP | 5105319 B2 | 12/2012 |
| KR | 101453921 B2 | 10/2014 |
| KR | 10-1787271 | 10/2017 |
| KR | 10-1787271 B1 | 10/2017 |
| KR | 101787271 B1 * | 10/2017 |

OTHER PUBLICATIONS

Preliminary Rejection issued in connection with Korean patent application 10-2018-0013951 dated Feb. 5, 2018.

* cited by examiner

FIG.4
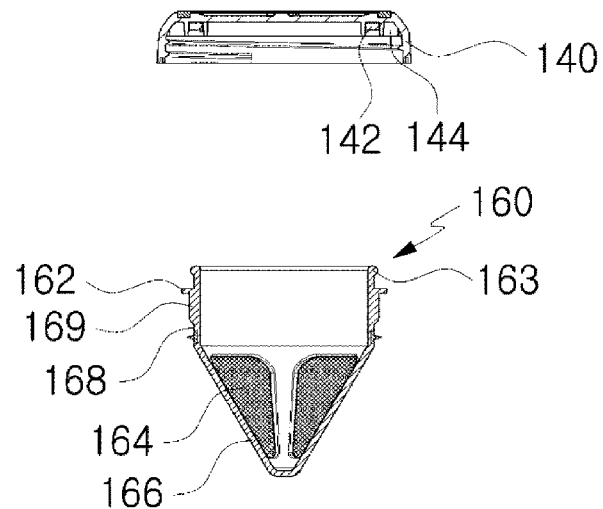
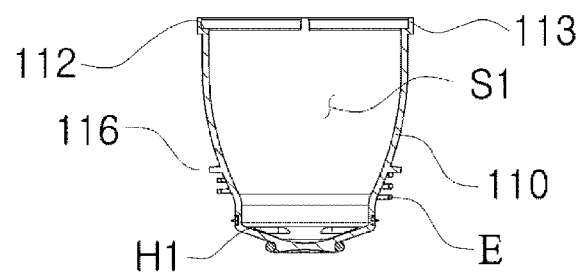
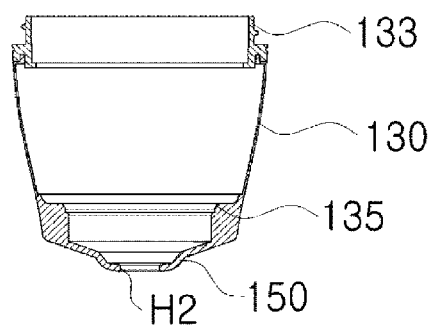

DRIP CONTAINER AND PORTABLE COFFEE DRINKING CONTAINER

CROSS-REFERENCE TO RELATED APPLICATIONS

This is a 35 U.S.C. 371 National Stage Patent Application of International Application No. PCT/KR2019/001481, filed Feb. 1, 2019, which claims priority to Korean application 10-2018-0013951, filed Feb. 5, 2018, each of which is hereby incorporated by reference in its entirety.

TECHNICAL FIELD

The present invention relates to a drip container and a portable coffee drinking container. More particularly, the present invention relates to a drip container and a portable coffee drinking container that provide convenience to the user.

BACKGROUND ART

Recently, brewed coffee has been widely consumed instead of instant coffee due to flavor and quality. Thus, brewed-coffee specialty stores and brewed-coffee lovers have increased.

Further, if a person wishes to drink brewed coffee at home or in an office, he or she can prepare brewed coffee by using a grinding device to make coffee beans into grounds, and then putting the grounds into a filtering device to brew the coffee liquid. Alternatively, a user can buy an espresso coffee machine to prepare brewed coffee.

However, in places where a grinding device and a filtering device, or an espresso coffee machine is provided, it is possible to prepare brewed coffee without using the brewed-coffee specialty stores. Conversely, in places where the grinding device and the filtering device, or the espresso coffee machine is not provided, it is impossible to prepare brewed coffee without using the brewed-coffee specialty stores.

That is, in the case of instant coffee, it is easy to prepare instant coffee in traveling or other outdoor spaces only with instant coffee, cups, and hot water. However, in the case of brewed coffee, a grinding device and a filtering device, or an espresso coffee machine needs to be provided which is relatively bulky than instant coffee. Therefore, it is very cumbersome and inconvenient to prepare brewed coffee while traveling or in other outdoor spaces.

Accordingly, in recent years, grinding devices and filtering devices have been manufactured in small sizes, and have been sold on the market (coffee grounds obtained by grinding devices have been sold on the market) so that it is convenient for the brewed coffee lovers to carry the grinding devices and the filtering devices. However, coffee drinkers still have the inconvenience of preparing and carrying the grinding device, the filtering device, a coffee cup, and a vacuum flask containing hot water. In addition, there is a problem in that the taste and the aroma of brewed coffee are lost while the coffee liquid passing through the grinding device and the filtering device is poured into the coffee cup.

In addition, the espresso coffee machines sold on the market are costly, and it is difficult to adjust the concentration of brewed coffee depending on personal preference.

As a documents of the related art for the present invention, there is Korean Utility Model Publication No. 20-2009-000673, "TUMBLER WITH FILTER NET CONTAINER".

DISCLOSURE

Technical Problem

The present invention is directed to providing a drip container and a portable coffee drinking container that prevent the inconvenience of preparing and carrying a filtering device for making drip coffee and a container for drinking drip coffee.

Technical Solution

According to an embodiment of the present invention, there is provided a drip container including: a first main body providing a first space for dripping in which coffee grounds are stored, including an outlet hole through which drip coffee made by dripping discharges into a second space, and including an outward protrusion that protrudes outward from a region of an outer wall defining the first space; a cover surrounding the first main body so that the first main body is protected; a first opening and closing part detachably engaged with the cover so that opening and closing of the first space are adjusted; an inflow part including an inlet hole through which the drip coffee discharging through the outlet hole flows into the second space; and an elastic part elastically deformed due to pressure applied by the outward protrusion when the first opening and closing part is engaged, and placed between the first main body and the cover so that restoring force acts on the outward protrusion, wherein a position of the first main body is changed by interaction between the first opening and closing part and the elastic part, thereby adjusting communication between the outlet hole and the inlet hole.

According to another embodiment of the present invention, there is provided a portable coffee drinking container including: a first main body providing a first space for dripping in which coffee grounds are stored, including an outlet hole through which drip coffee made by dripping discharges into a second space, and including an outward protrusion that protrudes outward from a region of an outer wall defining the first space; a second main body providing the second space, and including an inlet hole through which the drip coffee discharging through the outlet hole flows into the second space; a cover surrounding the first main body and the second main body so that the first main body and the second main body are placed inside the cover; a first opening and closing part detachably engaged with the cover so that opening and closing of the first space in which the coffee grounds are stored are adjusted; and an elastic part elastically deformed due to pressure applied by the outward protrusion when the first opening and closing part is engaged, and placed between the first main body and the cover so that restoring force acts on the outward protrusion, wherein a position of the first main body is changed by interaction between the first opening and closing part and the elastic part, thereby adjusting communication between the outlet hole and the inlet hole.

Advantageous Effects

According to the present invention, the drip container and the portable coffee drinking container can prevent the inconvenience of preparing and carrying a filtering device for making drip coffee and a container for drinking drip coffee.

In addition, the loss of the taste and the aroma of drip coffee that may occur while pouring the drip coffee into the coffee cup can be prevented.

In addition, the present invention facilitates washing, thereby maximizing the convenience and the cleanliness thereof to the user.

DESCRIPTION OF DRAWINGS

FIG. 4 is a schematic cross-sectional view showing a drip container in an exploded manner according to an embodiment of the present invention.

BEST MODE

Figure 1:
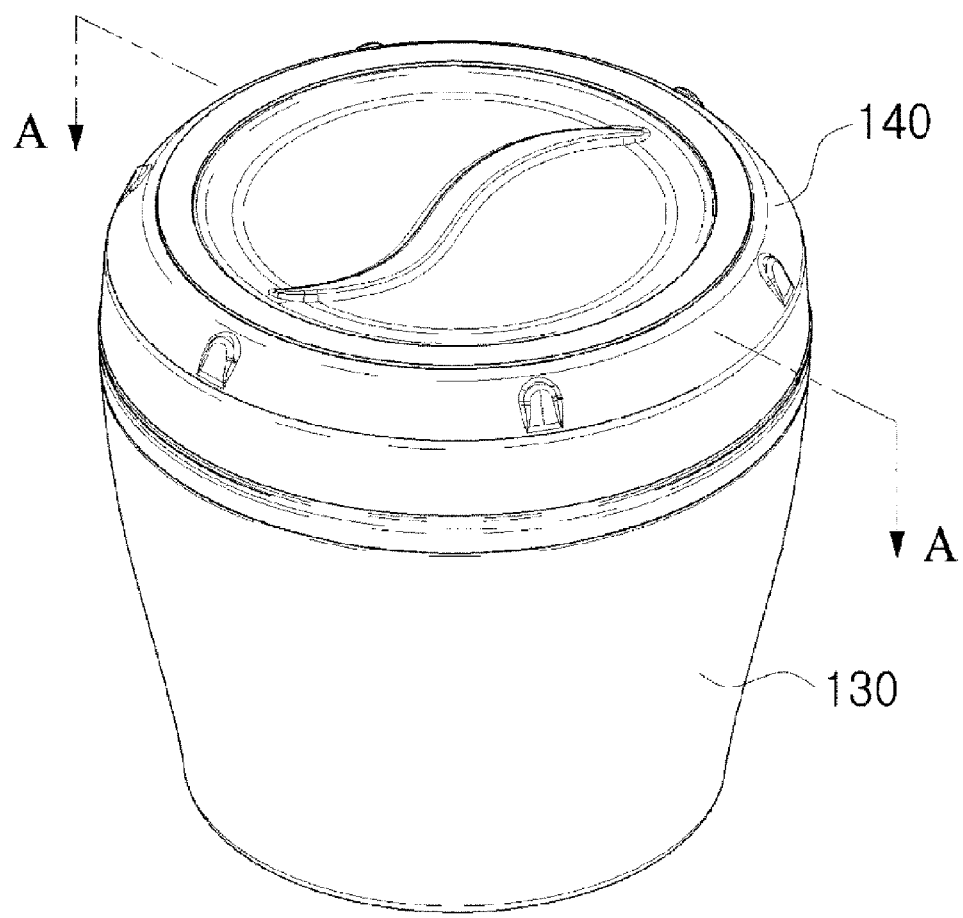
FIG. 1 is a schematic perspective view showing a drip container according to an embodiment of the present invention.

Hereinafter, embodiments of the present invention will be described in detail with reference to the accompanying drawings. Meanwhile, the technical idea of the present invention is not limited to the suggested embodiments, and those skilled in the art and understanding the technical idea of the present invention could easily suggest other embodiments which fall within the scope of the idea of the present invention of a retrogressive invention through addition of another component, modification, and deletion without departing from the scope of the idea of the present invention. The suggested embodiments also fall within the scope of the idea of the present invention.

In addition, elements having the same function within the scope of the same technical idea shown in the drawing of each embodiment are described using the same reference number.

According to an embodiment of the present invention, there is provided a drip container including: a first main body providing a first space for dripping in which coffee grounds are stored, including an outlet hole through which drip coffee made by dripping discharges into a second space, and including an outward protrusion that protrudes outward from a region of an outer wall defining the first space; a cover surrounding the first main body so that the first main body is protected; a first opening and closing part detachably engaged with the cover so that opening and closing of the first space are adjusted; an inflow part including an inlet hole through which the drip coffee discharging through the outlet hole flows into the second space; and an elastic part elastically deformed due to pressure applied by the outward protrusion when the first opening and closing part is engaged, and placed between the first main body and the cover so that restoring force acts on the outward protrusion, wherein a position of the first main body is changed by interaction between the first opening and closing part and the elastic part, thereby adjusting communication between the outlet hole and the inlet hole.

When the first opening and closing part is engaged with the cover, the outward protrusion applies pressure to the elastic part and a distance between facing surfaces of the first main body and the inflow part is thus reduced, thereby cutting off the communication between the outlet hole and the inlet hole. When the first opening and closing part is detached from the cover, the elastic part applies the restoring force to the outward protrusion so as to return the first main body to its original position, thereby implementing the communication between the outlet hole and the inlet hole.

A predetermined region at a lower portion of the first main body may be smaller in diameter than an upper portion of the first main body, the outward protrusion may be positioned at the predetermined region, and the elastic part may be positioned in a space between the first main body and the cover, the space being ensured because the diameter of the predetermined region is smaller than the diameter of the upper portion of the first main body.

The drip container may further include a filter including a filter net to enable dripping when placed in the first space, and including an anti-leakage ring that extends in a protruding manner upward from an upper portion of the filter, wherein the first opening and closing part may include a first ring member that is in contact with the anti-leakage ring to make an inner space of the filter airtight when the first opening and closing part is engaged with the cover.

The cover may include an anti-leakage end that extends in a protruding manner upward from a top end of the cover which is engaged with the first opening and closing part, and the first opening and closing part may include a second ring member that is in contact with the anti-leakage end to make an inner space of the cover airtight when the first opening and closing part is engaged with the cover.

The drip container may further include a closing part placed at at least one of facing surfaces of the first main body and the inflow part, wherein when the first opening and closing part is engaged with the cover, the closing part is in contact with both of the facing surfaces of the first main body and the inflow part and thus cuts off the communication between the outlet hole and the inlet hole.

According to another embodiment of the present invention, there is provided a portable coffee drinking container including: a first main body providing a first space for dripping in which coffee grounds are stored, including an outlet hole through which drip coffee made by dripping discharges into a second space, and including an outward protrusion that protrudes outward from a region of an outer wall defining the first space; a second main body providing the second space, and including an inlet hole through which the drip coffee discharging through the outlet hole flows into the second space; a cover surrounding the first main body and the second main body so that the first main body and the second main body are placed inside the cover; a first opening and closing part detachably engaged with the cover so that opening and closing of the first space in which the coffee grounds are stored are adjusted; and an elastic part elastically deformed due to pressure applied by the outward protrusion when the first opening and closing part is engaged, and placed between the first main body and the cover so that restoring force acts on the outward protrusion, wherein a position of the first main body is changed by interaction between the first opening and closing part and the elastic part, thereby adjusting communication between the outlet hole and the inlet hole.

The first opening and closing part may be detached from the cover so that the drip coffee flows into the second space through the outlet hole and the inlet hole, and then the first opening and closing part may be engaged with the cover so that the communication between the outlet hole and the inlet hole is cut off, and the cover may enable the first main body to be positioned in a direction of gravity from the second main body, so that the drip coffee flowing into the second space can be drunk.

When the first opening and closing part is engaged with the cover, the outward protrusion applies pressure to the elastic part and a distance between facing surfaces of the first main body and the inflow part is thus reduced, thereby cutting off the communication between the outlet hole and the inlet hole. When the first opening and closing part is detached from the cover, the elastic part applies the restoring force to the outward protrusion so as to return the first main body to its original position, thereby implementing the communication between the outlet hole and the inlet hole.

A predetermined region at a first side of the first main body may be smaller in diameter than a second side of the first main body which is positioned in a direction pointing away from the second main body with respect to the predetermined region, the outward protrusion may be positioned at the predetermined region, and the elastic part may be positioned in a space between the first main body and the cover, the space being ensured because the diameter of the predetermined region is smaller than the diameter of the second side.

The portable coffee drinking container may further include: a filter including a filter net to enable dripping when placed in the first space, and including an anti-leakage ring that extends in a protruding manner from a first side of the filter in a direction pointing away from the second main body, wherein the first opening and closing part may include a first ring member that is in contact with the anti-leakage ring to make an inner space of the filter airtight when the first opening and closing part is engaged with the cover.

The cover may include an anti-leakage end that extends in a protruding manner from a first side of the cover which is engaged with the first opening and closing part, in a direction pointing away from the second main body, and the first opening and closing part may include a second ring member that is in contact with the anti-leakage end to make an inner space of the cover airtight when the first opening and closing part is engaged with the cover.

The portable coffee drinking container may further include: a closing part placed at at least one of facing surfaces of the first main body and the second main body, wherein the closing part may be in contact with both of the facing surfaces of the first main body and the second main body due to pressure applied by the first opening and closing part to the filter, and may thus cut off the communication between the outlet hole and the inlet hole.

The portable coffee drinking container may further include: a drinking part detachably engaged with the second main body, and including a drinking hole through which the drip coffee flowing into the second space discharges to outside for drinking, and a vent hole for adjusting pressure so that the drip coffee discharges through the drinking hole; and a drinking adjusting part detachably engaged with the drinking part to adjust opening and closing of the drinking hole and the vent hole.

The drinking adjusting part may include a close-contact part that is in close contact with the drinking hole and the vent hole and thus closes the drinking hole and the vent hole when the drinking adjusting part is inserted into the drinking part, and the close-contact part may have elasticity, and may have a portion that corresponds to the drinking hole and the vent hole and is formed in multiple layers.

The portion of the close-contact part may be formed in the multiple layers spaced apart from each other.

Figure 2:
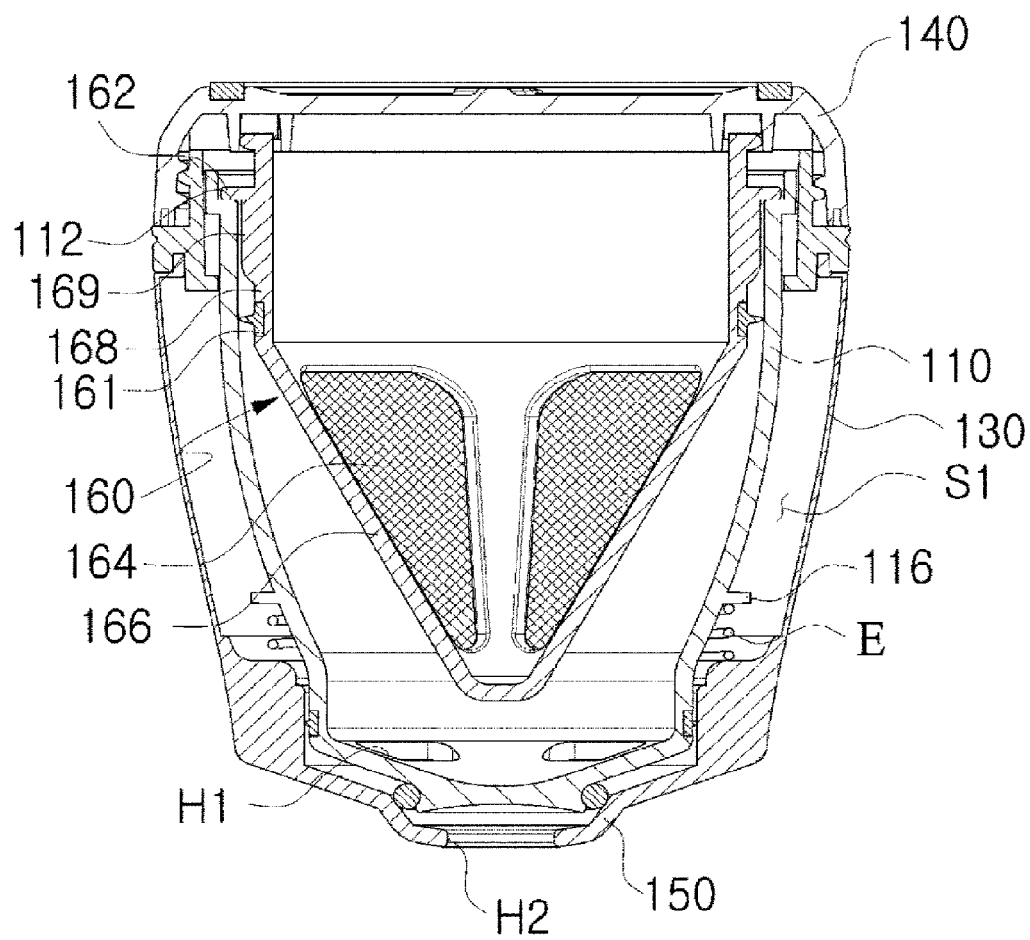
FIG. 2 is a schematic cross-sectional view taken along line AA of FIG. 1.

FIG. 1 is a schematic perspective view showing a drip container according to an embodiment of the present invention. FIG. 2 is a schematic cross-sectional view taken along line AA of FIG. 1.

Figure 3:
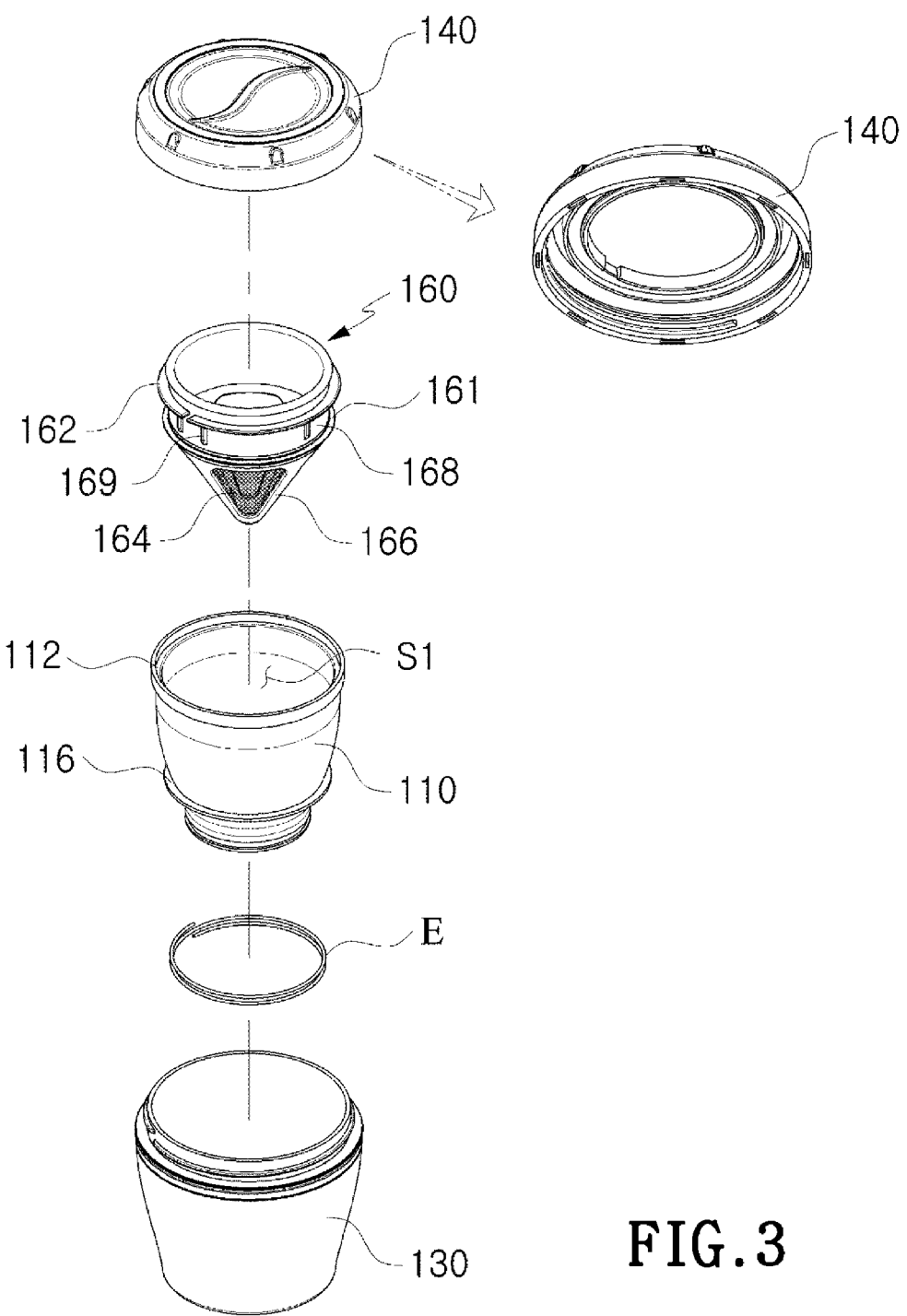
FIG. 3 is a schematic exploded perspective view showing a drip container according to an embodiment of the present invention.

In addition, FIG. 3 is a schematic exploded perspective view showing a drip container according to an embodiment of the present invention. FIG. 4 is a schematic cross-sectional view showing a drip container in an exploded manner according to an embodiment of the present invention.

Referring to FIGS. 1 to 4, according to an embodiment of the present invention, a drip container 100 is a type of dripper capable of making drip coffee by pouring hot water onto coffee grounds P. The drip container 100 may include: a first main body 110 providing a first space S1 for dripping in which the coffee grounds P (see FIG. 6) are stored; a cover 130 surrounding the first main body 110 so that the first main body 110 is protected from the outside; a first opening and closing part 140 detachably engaged with the cover 130; and an inflow part 150 through which the drip coffee flows into a second space S2 (see FIG. 6).

Herein, the second space S2 may refer to a space outside the drip container 100 according to an embodiment of the present invention, and may refer to, for example, an inner space of a type of cup C (see FIG. 5) that receives the drip coffee flowing out of the drip container 100.

The first main body 110 may include an outlet hole H1 through which the drip coffee made by dripping discharges into the second space S2. The outlet hole H1 may be formed at the bottom surface of the first main body 110 in a penetrating manner.

The outlet hole H1 is not limited in number, but preferably, multiple outlet holes are radially formed.

In the meantime, the bottom surface of the first main body 110 may be formed in a shape in which the top is wide and the bottom is narrow, for example, a funnel. Thus, the drip coffee made by dripping naturally passes through the outlet hole H1.

The first main body 110 may include a stepped wall 113 extending in a protruding manner upward from the upper surface of the first main body 110. The stepped wall 113 may make the inside of the drip container 100 airtight when being combined with the first opening and closing part 140.

The cover 130 may serve as an external appearance of the drip container 100 according to an embodiment of the present invention, and may be an element with which the first opening and closing part 140 is detachably engaged.

The first opening and closing part 140 may be detachably engaged with the cover 130 and may adjust the opening and the closing of the first space S1 for storing the coffee grounds P.

The first opening and closing part 140 may be engaged with the cover 130 in a screw-type fastening manner as shown in the drawings, but no limitation thereto is imposed. The first opening and closing part 140 may be engaged with the cover 130 in a forcibly interlocking manner.

The inflow part 150 may include the inlet hole H2 through which the drip coffee discharging through the outlet hole H1 flows into the second space S2. Placed in the direction of gravity from the first main body 110, the inflow part 150 enables the drip coffee to flow into the second space S2.

Herein, the inflow part 150 may be formed in an integrated manner with the cover 130, but no limitation thereto is imposed. The inflow part 150 may be formed as a separate member.

The cover 130 may include an anti-leakage end 133. The anti-leakage end 133 may make the inside of the drip container 100 airtight when being combined with the first opening and closing part 140.

In the meantime, according to an embodiment of the present invention, the drip container 100 may include a filter 160 that enables dripping when placed in the first space S1. The filter 160 may include a seated portion 162 so that the filter 160 is positioned at a predetermined position within the first space S1. The seated portion 162 protrudes from the outer surface and is seated on a stepped portion 112 formed at the inner surface of the first main body 110.

The filter 160 may include: a net providing part 166 on which a filter net 164 for dripping is formed; and an anti-inflow part 168 formed extending from the net providing part 166 so that water poured to the inside of the net providing part 166 is prevented from flowing into the second space S2 without passing through the coffee grounds P.

Herein, the seated portion 162 may be formed protruding from the outer surface of the anti-inflow part 168.

The net providing part 166 may be in a shape in which the top is wide and the bottom is narrow, and the anti-inflow part 168 may be in a cylindrical shape, but no limitation thereto is imposed.

The filter 160 may include an anti-eccentricity part 169 protruding from the outer surface of the anti-inflow part 168 and being in contact with the inner surface of the first main body 110 so that when the filter 160 is placed in the first space S1, the filter 160 is prevented from being placed eccentrically within the first space S1.

As shown in the drawings, multiple anti-eccentricity parts 169 may be formed spaced apart from each other along the circumferential direction, but no limitation thereto is imposed. The multiple anti-eccentricity parts 169 may be formed continuously along the circumferential direction.

In the meantime, regarding the filter 160, the hot water poured onto the coffee grounds P may flow into a space between the first main body 110 and the anti-inflow part 168 due to carelessness, but may not flow into a space between the first main body 110 and the net providing part 166 by a first sealing part 161.

The first sealing part 161 may be provided on the outer surface of the anti-inflow part 168 in such a manner as to be in contact with the first main body 110, and may be made of a rubber material, or the like having elasticity.

The filter 160 may include an anti-leakage ring 163 extending upward. The anti-leakage ring 163 may make the inside of the drip container 100 airtight when being combined with the first opening and closing part 140.

In the meantime, in the drip container 100 according to an embodiment of the present invention, the communication between the outlet hole H1 and the inlet hole H2 may be adjusted by the interaction between the first opening and closing part 140 and the cover 130, which will be described below with reference to FIGS. 5 to 7.

Figure 5:
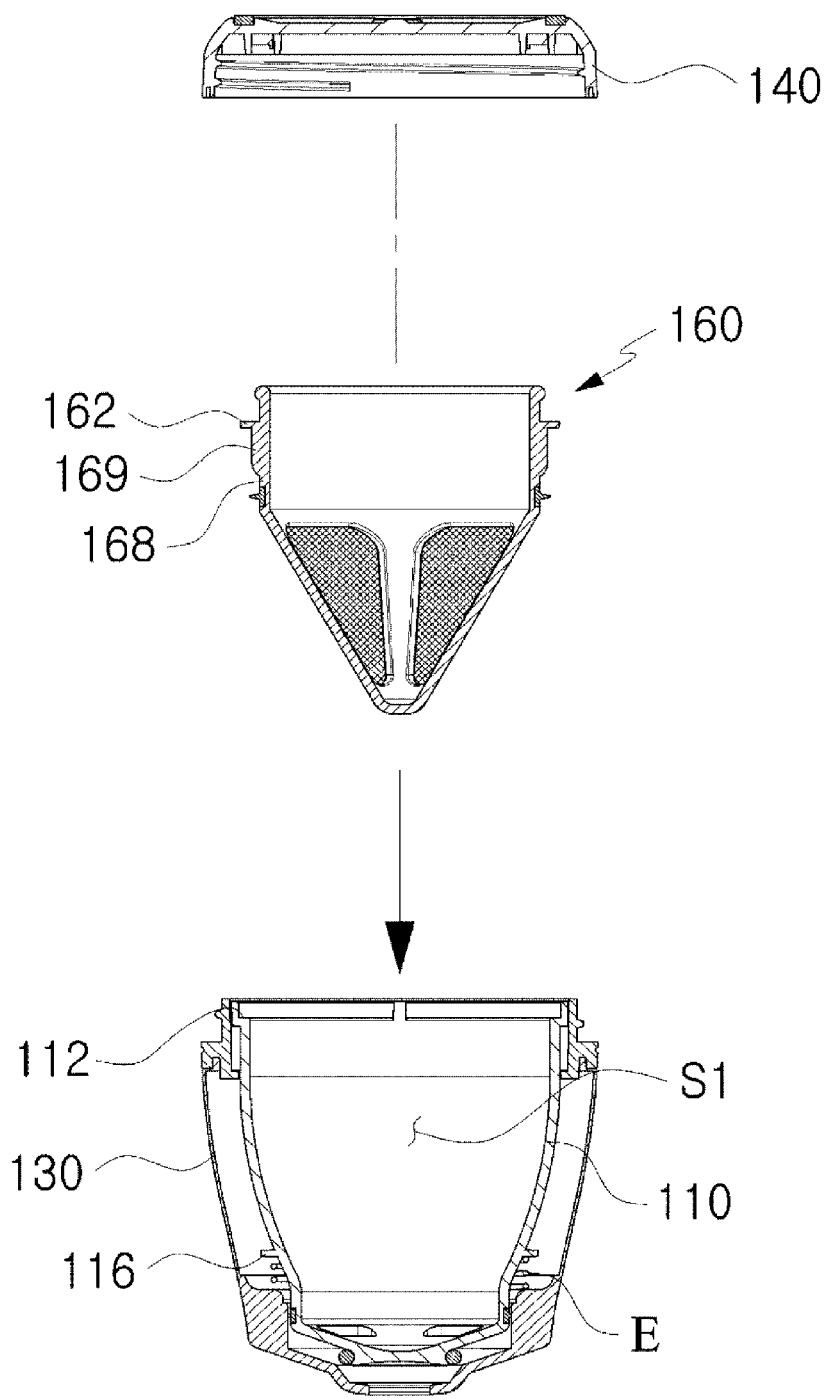
FIGS. 5 to 7 are schematic cross-sectional views showing a method of using a drip container according to an embodiment of the present invention.
Figure 6:
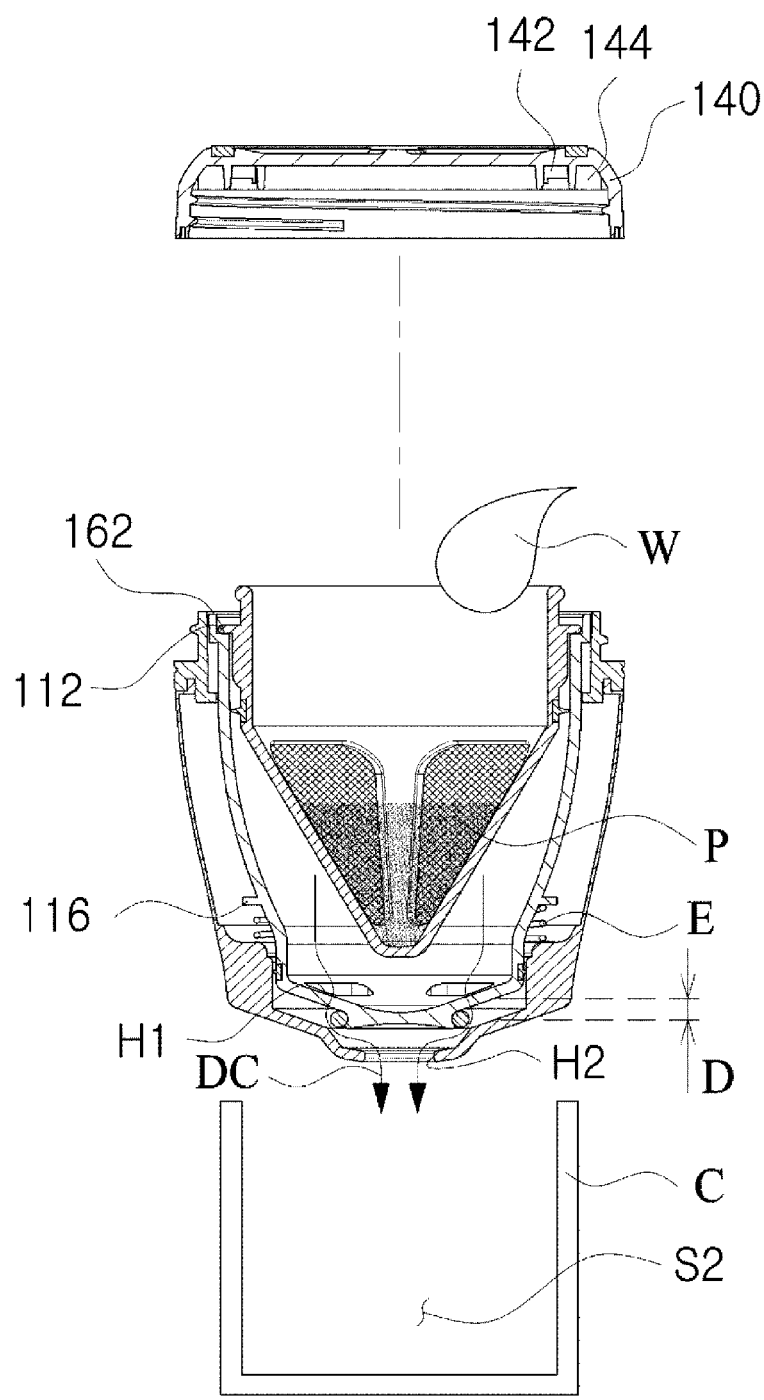
Figure 7:
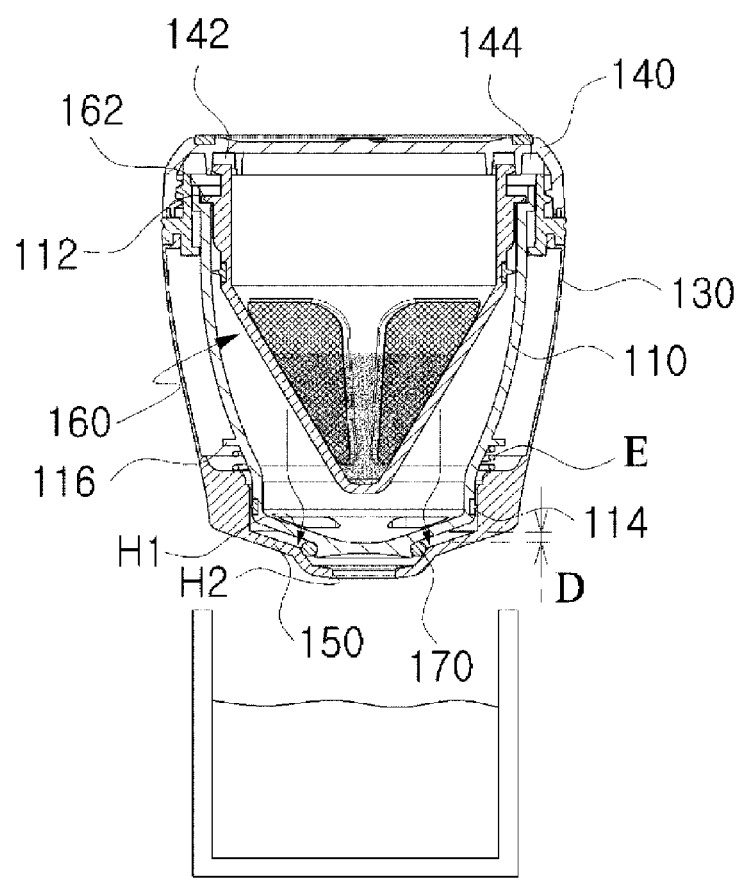

FIGS. 5 to 7 are schematic cross-sectional views showing a method of using a drip container according to an embodiment of the present invention.

Referring to FIG. 5, to make drip coffee, the first opening and closing part 140 is detached from the cover 130, and the filter 160 is inserted into the first space S1 provided by the first main body 110.

However, when the filter 160 is already placed in the first space S1 before the first opening and closing part 140 is detached from the cover 130, the step of inserting the filter 160 may be omitted.

The seated portion 162 is seated on the stepped portion 112 formed at the inner surface of the first main body 110, so that the filter 160 is positioned at a predetermined position within the first space S1. By the anti-eccentricity part 169 protruding from the outer surface of the anti-inflow part 168, the filter 160 is prevented from being placed eccentrically within the first space S1.

Referring to FIG. 6, the filter 160 is inserted into the first space S1, and the seated portion 162 is seated on the stepped portion 112. Then, an appropriate amount of coffee grounds P is inserted into the filter 160, and hot water W is poured onto the coffee grounds P.

Herein, the outlet hole H1 and the inlet hole H2 may be in communication with each other, and as time passes, drip coffee DC is stored in the second space S2 provided by the cup C.

When the dripping process is completed, the user can drink the drip coffee DC, and the user needs to cut off the communication between the outlet hole H1 and the inlet hole H2.

Referring to FIG. 7, in order to cut off the communication between the outlet hole H1 and the inlet hole H2, the user rotates the first opening and closing part 140 to engage it with the cover 130.

Herein, the first opening and closing part 140 may adjust the communication between the outlet hole H1 and the inlet hole H2 by the interaction with the cover 130.

Specifically, when the first opening and closing part 140 is detached from the cover 130, the communication between the outlet hole H1 and the inlet hole H2 is implemented. When the first opening and closing part 140 is engaged with the cover 130, the communication between the outlet hole H1 and the inlet hole H2 is cut off.

This is because the position of the first main body 110 is changed by the interaction between the first opening and closing part 140 and the cover 130.

In other words, when the first opening and closing part 140 is engaged with the cover 130, a distance D between the facing surfaces of the first main body 110 and the inflow part 150 is reduced. Thus, a closing part 170 placed at at least one of the facing surfaces of the first main body 110 and the inflow part 150 is in contact with both of the facing surfaces of the first main body 110 and the inflow part 150. Consequently, the communication between the outlet hole H1 and the inlet hole H2 is cut off.

The closing part 170 may be a type of rubber ring made of a material having elasticity, and it is obvious that the rubber ring should be made of a material harmless to humans.

As described above, the principle that the first opening and closing part 140 is engaged with the cover 130 so that the communication between the outlet hole H1 and the inlet hole H2 is cut off will be described below in more detail.

When the first opening and closing part 140 is engaged with the cover 130, the first opening and closing part 140 applies pressure to the filter 160 by being in contact with the filter 160.

The first opening and closing part 140 being in contact with the filter 160 may include a first ring member 142 having elasticity. Due to this, when the first opening and closing part 140 is engaged with the cover 130, the first opening and closing part 140 gently applies pressure to the filter 160.

The first opening and closing part 140 may include multiple ring members that include the first ring member 142, and a second ring member 144. The multiple ring members fill gaps between the first opening and closing part 140 and the filter 160 being in contact with the first opening and closing part 140, between the first opening and closing part 140 and the first main body 110, or between the first opening and closing part 140 and the cover 130, thereby blocking liquid from leaking through the upper portion of the drip container 100.

The sealing of the upper portion of the drip container 100 through the first opening and closing part 140 will be described below in more detail.

When the first opening and closing part 140 applies pressure to the filter 160, the seated portion 162 of the filter 160 applies pressure to the stepped portion 112 of the first main body 110. Thus, the position of the first main body 110 is changed.

When the position of the first main body 110 is changed by the filter 160, the distance D between the facing surfaces of the first main body 110 and the inflow part 150 is further reduced. Accordingly, the closing part 170 provided at the first main body 110 is moved toward the inflow part 150, and is eventually in contact with the inflow part 150.

The closing part 170 being in contact with the inflow part 150 serves as a type of partition that divides the outlet hole H1 from the inlet hole H2. Eventually, the communication between the outlet hole H1 and the inlet hole H2 is cut off.

In the meantime, the drip container 100 according to the present invention may include an elastic part E that is elastically deformed due to the pressure applied by the first opening and closing part 140 to the filter 160, when the first opening and closing part 140 is engaged with the cover 130.

The elastic part E may be placed between the first main body 110 and the cover 130. Before the first opening and closing part 140 is engaged with the cover 130, the elastic part E maintains a normal state (see FIGS. 5 and 6) and thus supports the first main body 110 within the cover 130.

However, when the dripping process is completed and the first opening and closing part 140 is engaged with the cover 130 to cut off the communication between the outlet hole H1 and the inlet hole H2, the elastic part E is elastically deformed by the first main body 110 of which the position is changed due to the pressured applied by the filter 160.

Herein, when the making of drip coffee is repeated or the first opening and closing part 140 is detached from the cover 130 for washing, the elastic part E returns the first main body 110 to its original position due to restoring force caused by the elastic deformation. Thus, the communication between the outlet hole H1 and the inlet hole H2 is naturally implemented.

Any elastic part E may be applicable with no limitation in shape and material, if the elastic part E is elastically deformed when the first opening and closing part 140 is engaged with the cover 130, and if the elastic part E returns the first main body 110 to its original position due to restoring force caused by elastic deformation when the first opening and closing part 140 is detached from the cover 130. For example, the elastic part E may be a rubber material. Alternatively, the elastic part E may be a spring that surrounds the outside of the first main body 110.

There are a variety of positions of the elastic part E. For example, the elastic part E may be positioned on the upper portion of the cover 130 adjacent to the stepped portion so that the restoring force acts on the stepped portion 112 positioned at the top end of the first main body 110.

Alternatively, the elastic part E may be positioned on the lower portion of the first main body 110 and the cover 130.

There are various mechanisms for providing the position of the elastic part E and the restoring force of the elastic part E, which will be described later in more detail.

In the meantime, the first main body 110 may include a second sealing part 114 that has elasticity to prevent impurities, or the like other than the drip coffee from flowing into the second space S2 through the inlet hole H2.

The second sealing part 114 may be in contact with the inner surface of the cover 130 or the inner surface of the inflow part 150 when the first main body 110 is inserted into the cover 130.

Figure 8:
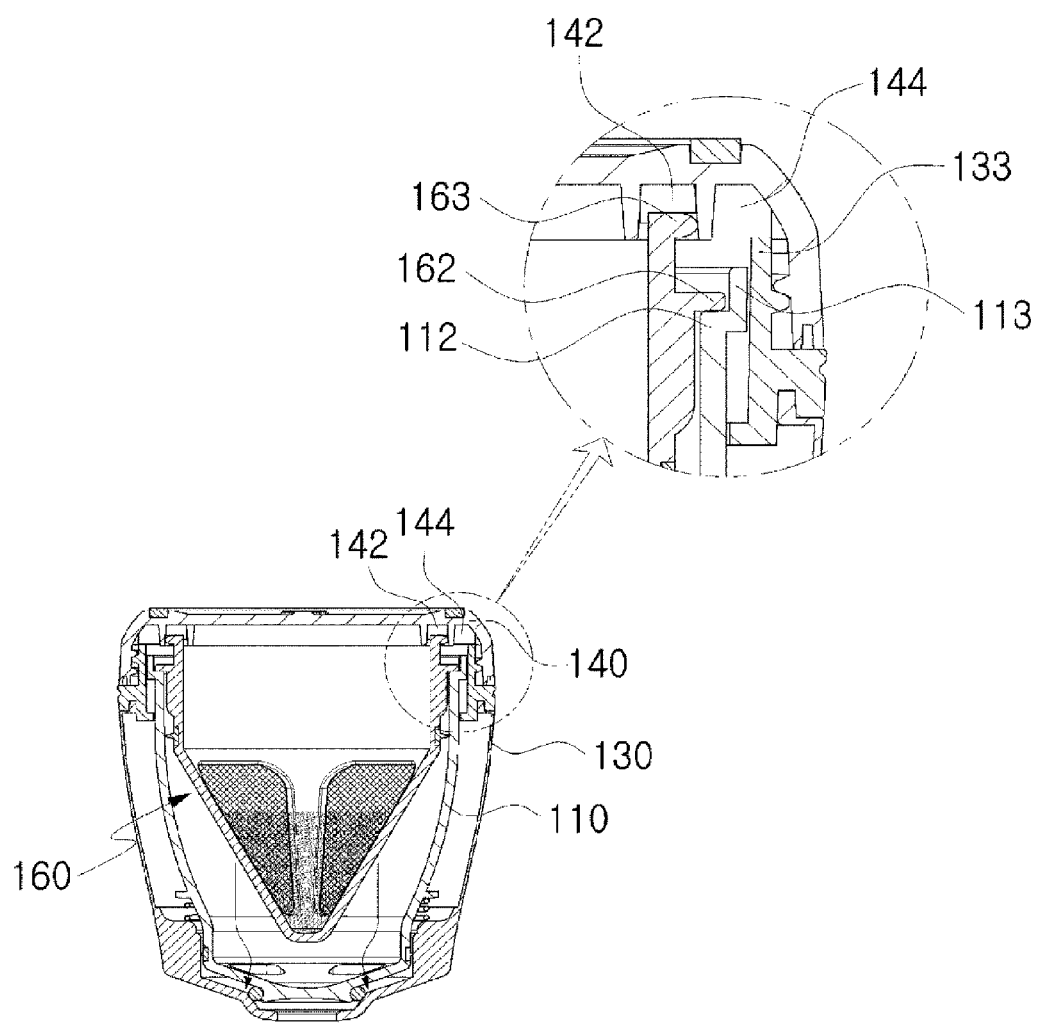
FIG. 8 is a partial enlarged cross-sectional view for the schematic cross-sectional view of FIG. 2.

FIG. 8 is a partial enlarged cross-sectional view for the schematic cross-sectional view of FIG. 2.

Referring to FIG. 8, when the first opening and closing part 140 is engaged with the cover, the inside of the drip container 100 is made airtight by the first ring member 142 and the second ring member 144.

The second ring member 144 may be formed with a larger diameter than the first ring member 142 and may be provided in a shape that surrounds the first ring member 142 at the outside of the first ring member 142.

Due to the pressure applied by the first opening and closing part 140, the anti-leakage ring 163 may be in contact with and may press the first ring member 142. Consequently, the liquid inside the filter 160 may be prevented from leaking to the outside through the first opening and closing part 140.

After passing through the filter net 164, the liquid inside the filter 160 may stay in a space between the filter 160 and the first main body 110. The liquid in the space also needs to be prevented from leaking through the first opening and closing part 140.

To this end, the pressure applied by the first opening and closing part 140 to the first ring member 142 may be transmitted to the seated portion 162 and the stepped portion 112, so that the seated portion 162 and the stepped portion 112 are bonded tightly. Consequently, the liquid may be prevented from leaking through the first opening and closing part 140 from the space between the filter 160 and the first main body 110.

In addition, due to the pressure applied by the first opening and closing part 140, the second ring member 144 may be in contact with and may press the anti-leakage end 133. The second ring member 144 is elastically deformed in a manner that fits to the shape of the anti-leakage end 133 due to the pressure, so that the second ring member 144 is in close contact with the anti-leakage end 133 without a gap.

Consequently, the liquid may be prevented from leaking to the outside through the first opening and closing part 140 from the space between the filter 160 and the first main body 110.

According to another embodiment, the stepped wall 113 extends upward. Therefore, when the first opening and closing part 140 is engaged, the stepped wall 113 is in close contact with the second ring member 144. Thus, the liquid may be prevented from leaking to the outside through the first opening and closing part 140 from the space between the filter 160 and the first main body 110.

Figure 9:
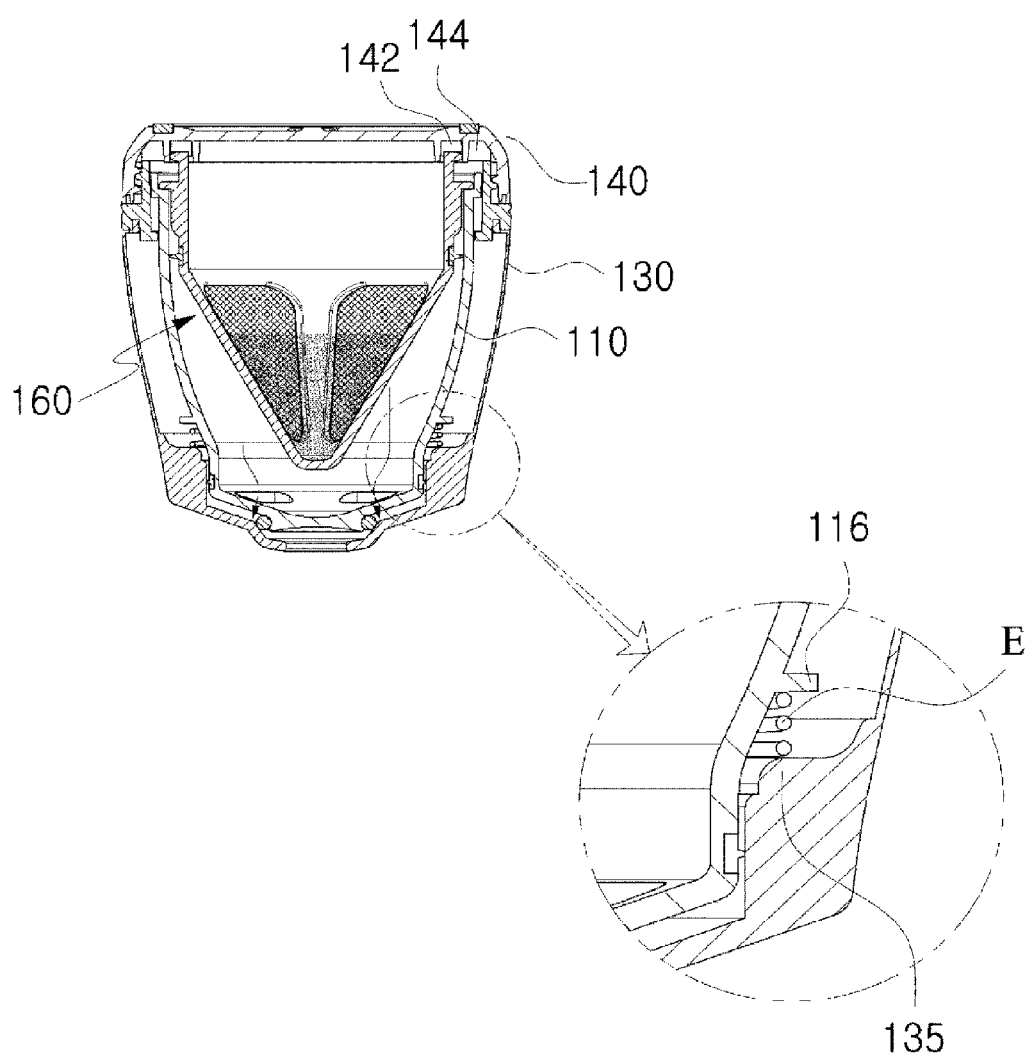
FIG. 9 is a partial enlarged cross-sectional view for the schematic cross-sectional view of FIG. 2.

FIG. 9 is a partial enlarged cross-sectional view for the schematic cross-sectional view of FIG. 2.

Referring to FIG. 9, surrounding the lower portion of the first main body 110, the elastic part E may be positioned between the first main body 110 and the cover 130.

Regarding the shape of the first main body 110, the diameter of the circular cross section decreases as it goes downward. Thus, a space in which the elastic part E is capable of moving between the first main body 110 and the cover 130 may be ensured.

Herein, the first main body 110 may include an outward protrusion 116 protruding outward along the circumference of the first main body 110 so as to provide a surface on which the restoring force of the elastic part E acts.

When pressure is applied by the first opening and closing part 140, the first main body 110 is moved downward, so that the elastic part E interposed between the outward protrusion 116 and the lower portion of the cover 130 is elastically deformed. By the outward protrusion 116, the restoring force of the elastic part E may be effectively transmitted to the first main body 110, and the elastic part E may be stably interposed between the first main body 110 and the cover 130.

The lower portion of the cover 130 may be provided with an elastic-part support 135 that protrudes inward from the inner surface of the cover 130. The elastic-part support 135 supports the elastic part E from below, so that the elastic-part support 135 and the outward protrusion 116, which supports the elastic part E from above, stably fix the elastic part E together. In addition, the elastic-part support 135 may provide a surface on which the restoring force of the elastic part E acts.

Figure 10:
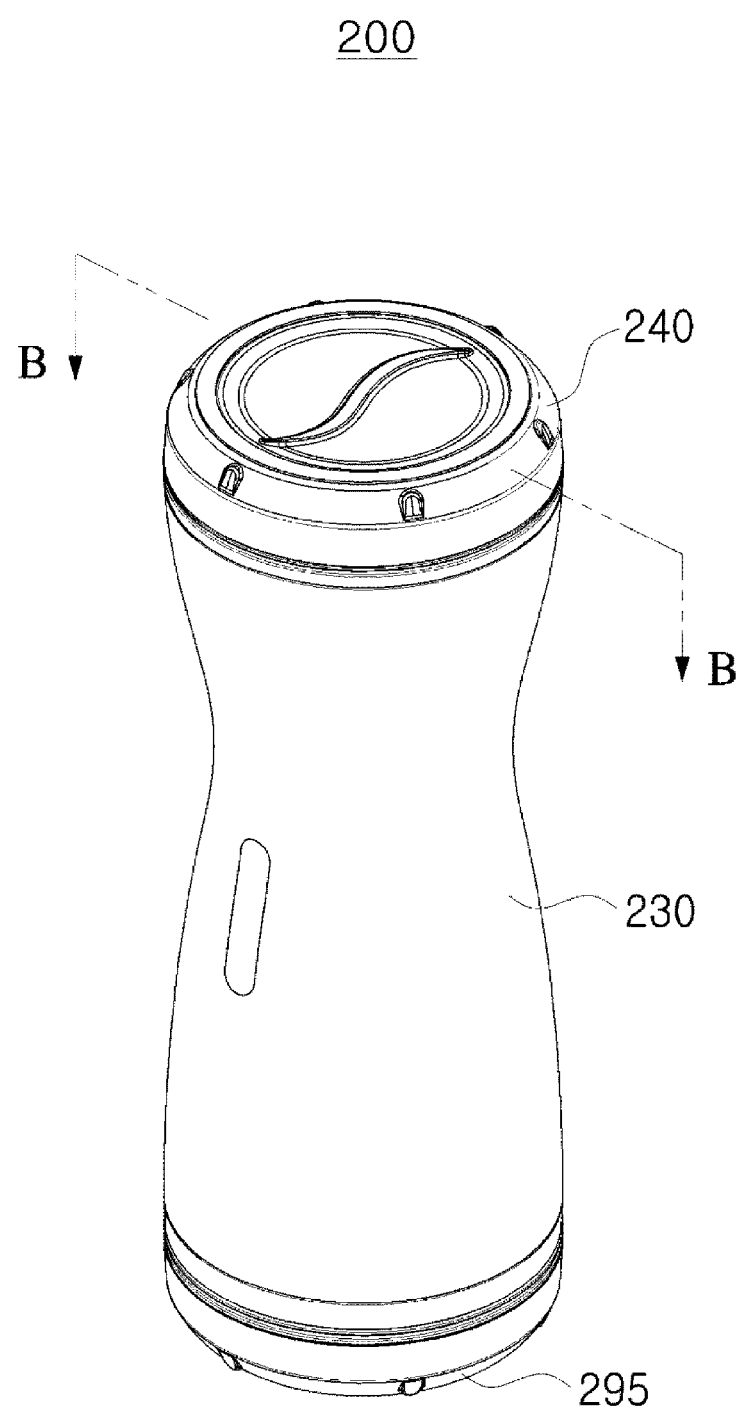
FIG. 10 is a schematic perspective view showing a portable coffee drinking container according to another embodiment of the present invention.
Figure 11:
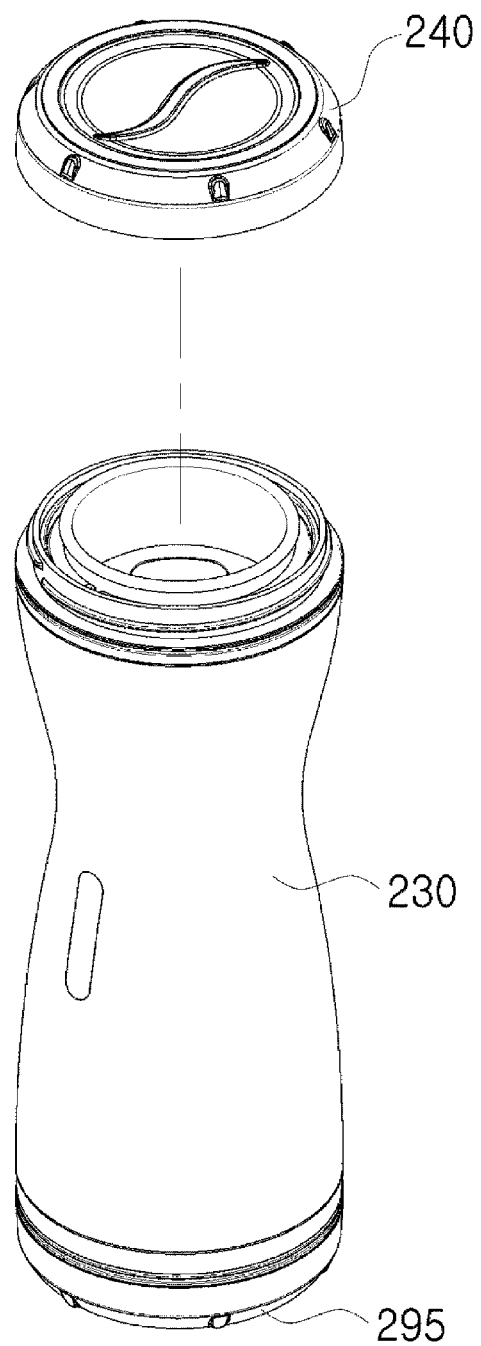
FIG. 11 is a schematic exploded perspective view showing a portable coffee drinking container according to another embodiment of the present invention in a state in which a first opening and closing part is detached from a cover for dripping.
Figure 12:
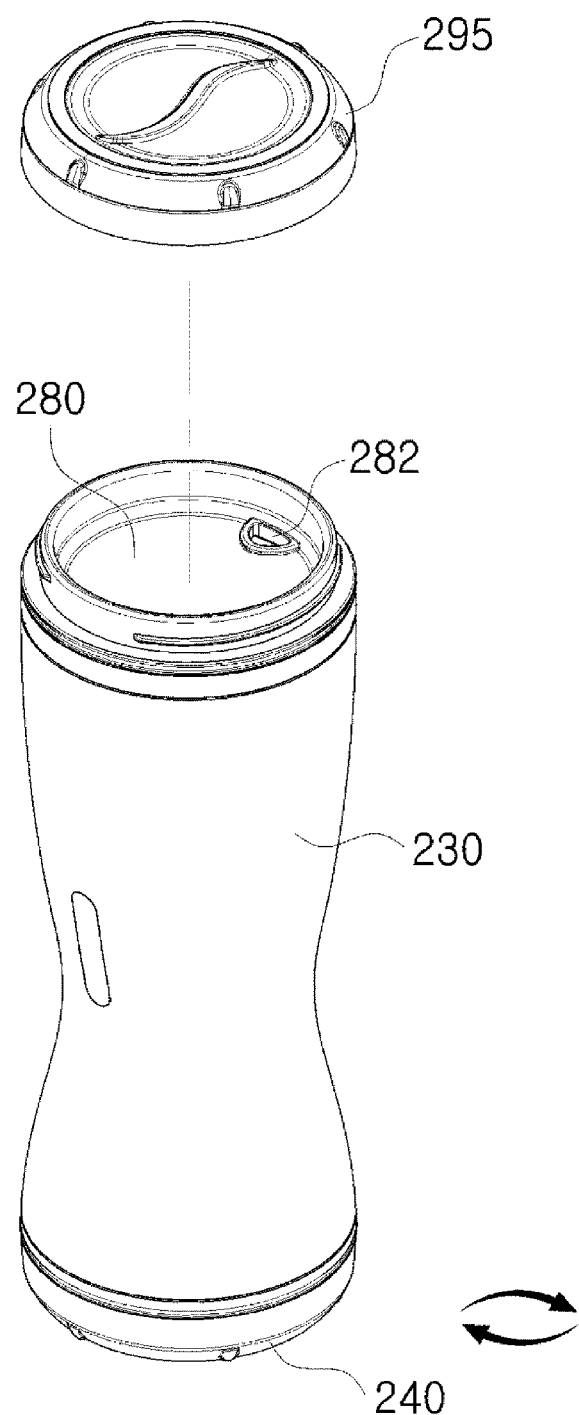
FIG. 12 is a schematic exploded perspective view showing a portable coffee drinking container according to another embodiment of the present invention in a state in which a second opening and closing part is detached from a drinking part for drinking drip coffee.

FIG. 10 is a schematic perspective view showing a portable coffee drinking container according to another embodiment of the present invention. FIG. 11 is a schematic exploded perspective view showing a portable coffee drinking container according to another embodiment of the present invention in a state in which a first opening and closing part is detached from a cover for dripping. FIG. 12 is a schematic exploded perspective view showing a portable coffee drinking container according to another embodiment of the present invention in a state in which a second opening and closing part is detached from a drinking part for drinking drip coffee.

Figure 13:
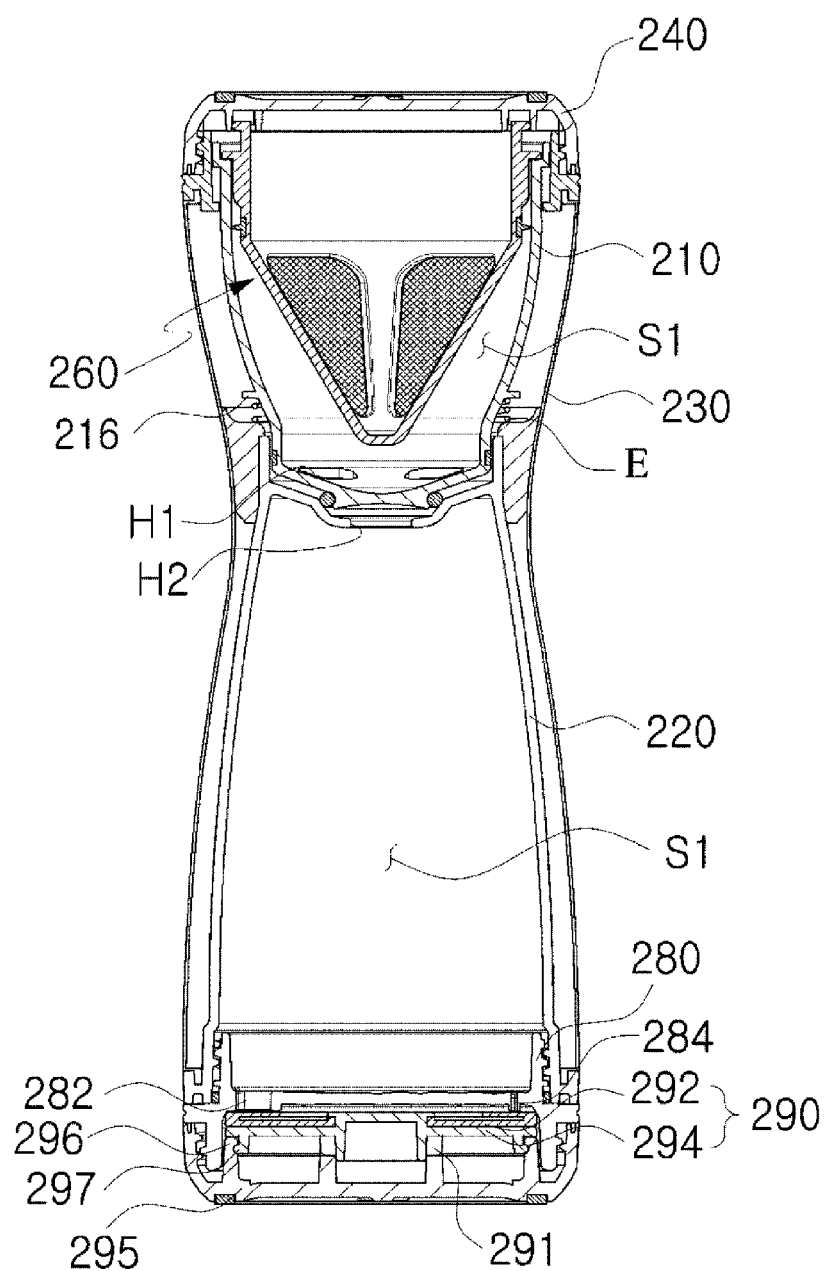
FIG. 13 is a schematic cross-sectional view taken along line BB of FIG. 10.
Figure 14:
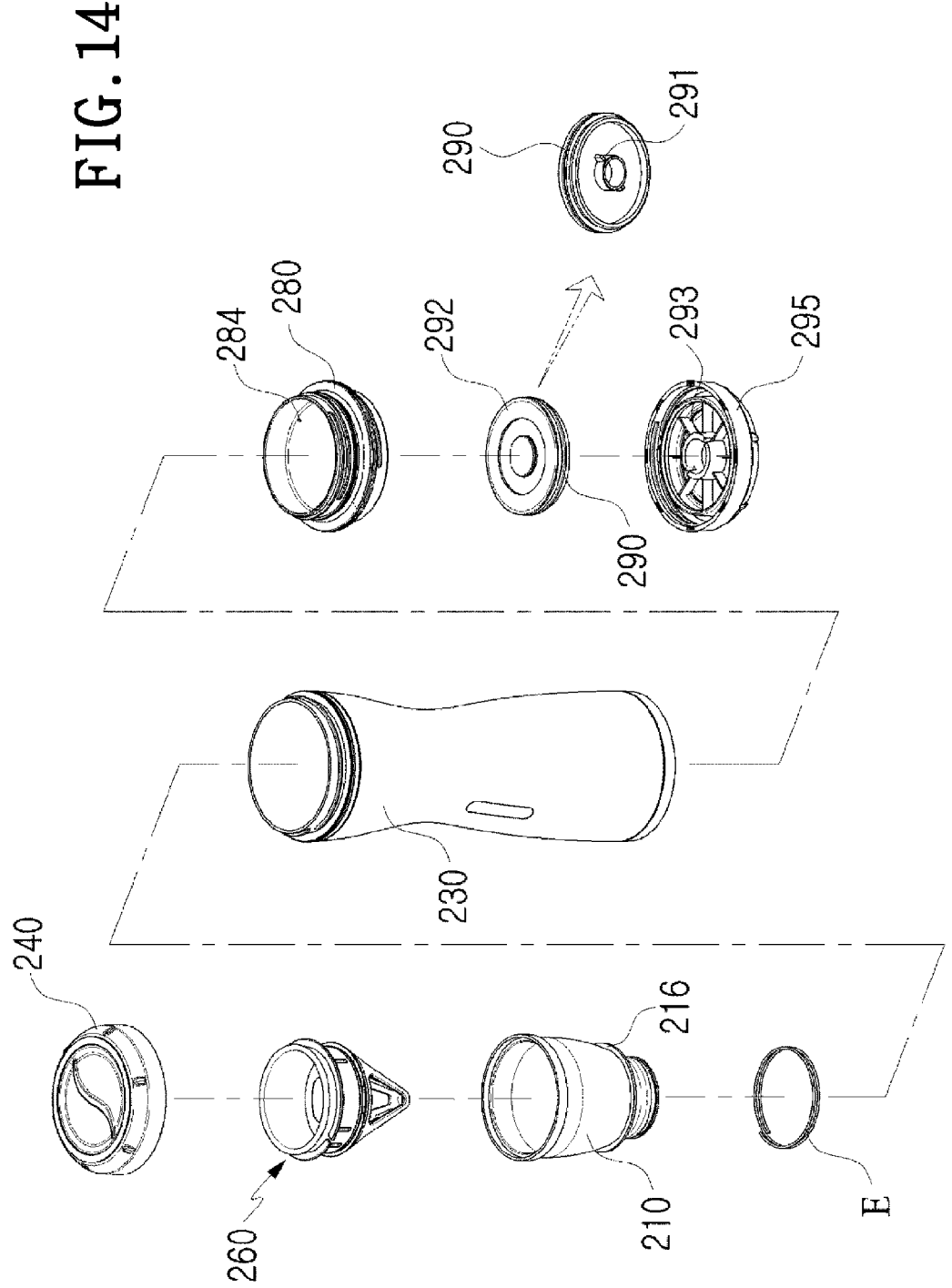
FIG. 14 is a schematic exploded perspective view showing a portable coffee drinking container according to another embodiment of the present invention.
Figure 15:
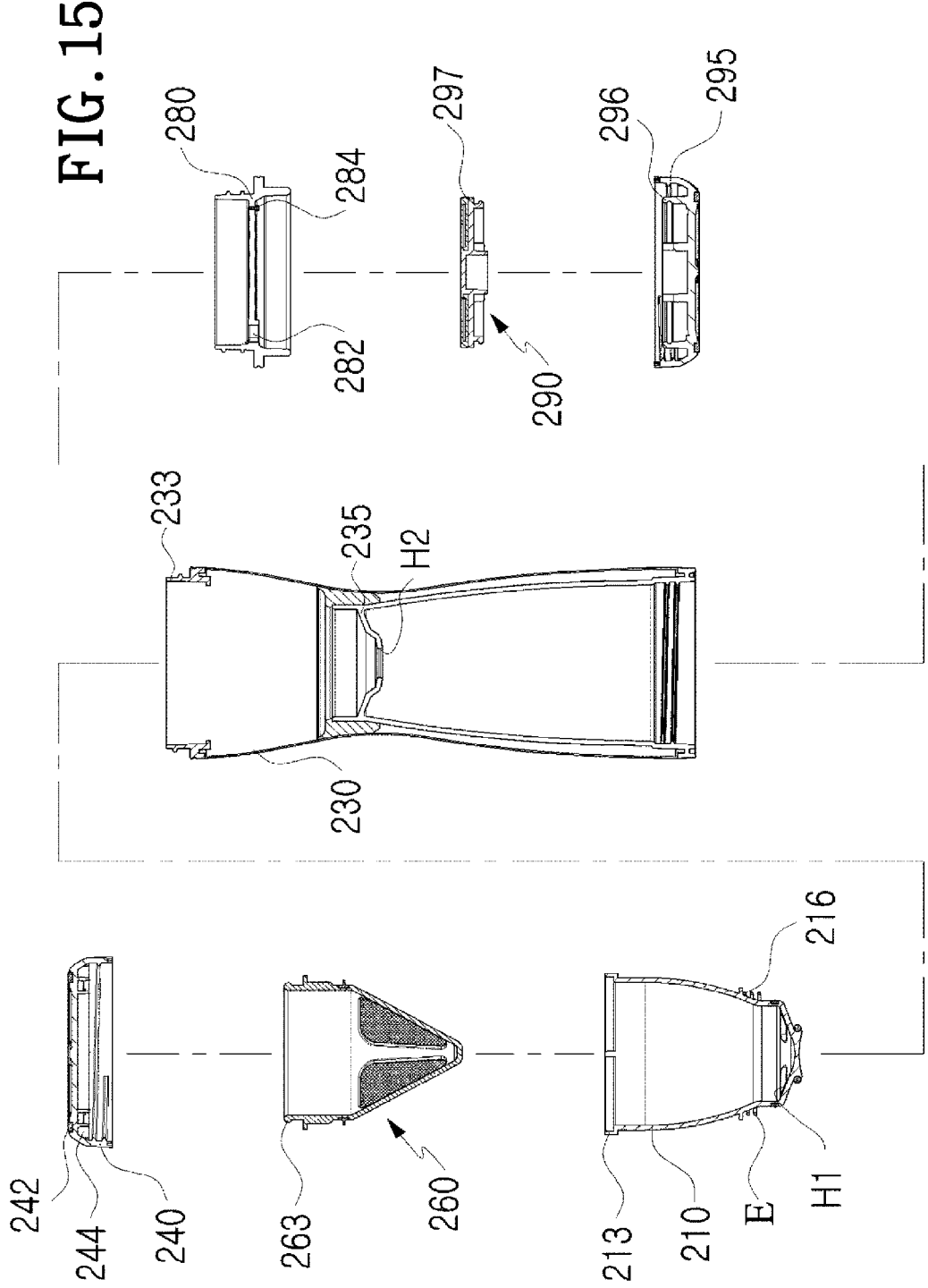
FIG. 15 is a schematic cross-sectional view showing a portable coffee drinking container in an exploded manner according to another embodiment of the present invention.

In addition, FIG. 13 is a schematic cross-sectional view taken along line BB of FIG. 10. FIG. 14 is a schematic exploded perspective view showing a portable coffee drinking container according to another embodiment of the present invention. FIG. 15 is a schematic cross-sectional view showing a portable coffee drinking container in an exploded manner according to another embodiment of the present invention.

Referring to FIGS. 10 to 15, according to another embodiment of the present invention, a portable coffee drinking container 200 uses the drip container 100 according to the embodiment of the present invention described above with reference to FIGS. 1 to 9. Hereinafter, in describing the portable coffee drinking container 200 according to the embodiment of the present invention, the description overlapping with that of the drip container 100 according to the embodiment of the present invention will be omitted.

Figure 17:
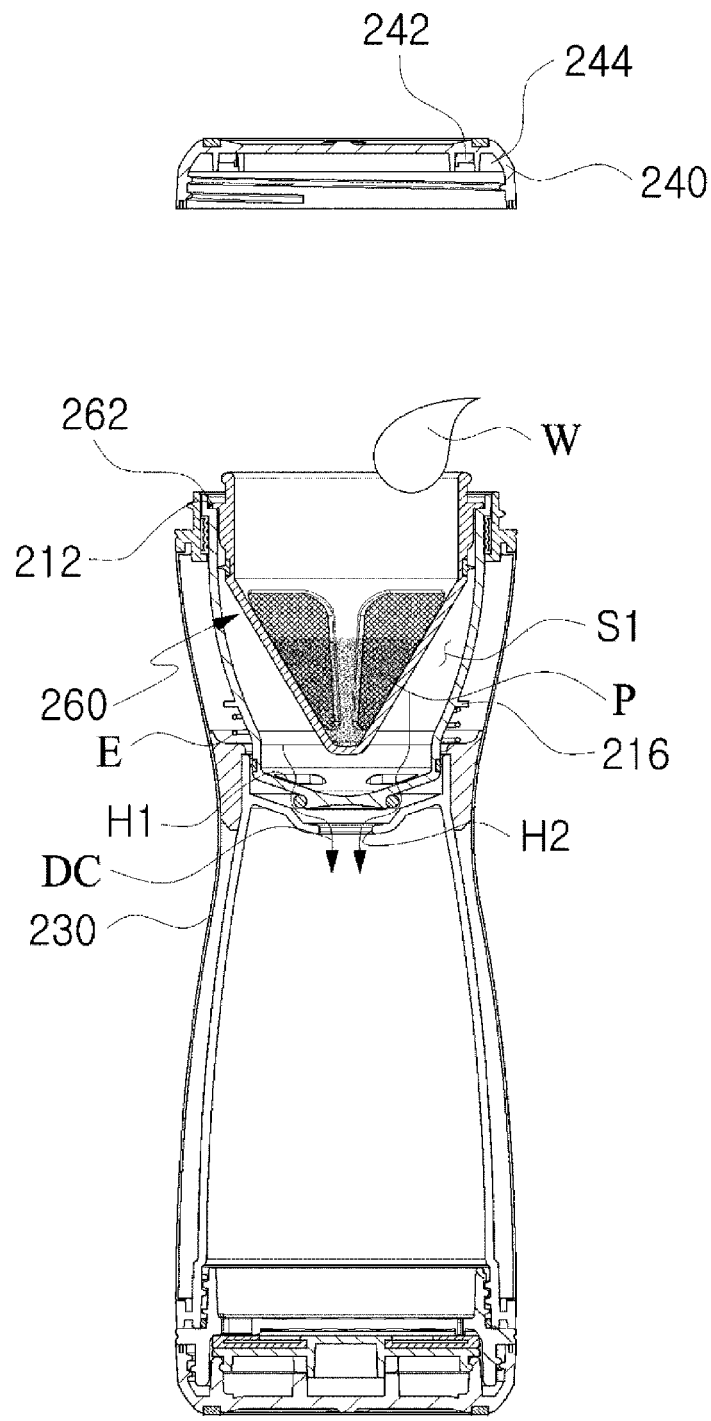

The portable coffee drinking container 200 is a container that enables drinking the drip coffee DC (see FIGS. 17 and 18) made by pouring hot water onto the coffee grounds P (see FIG. 17) and by filtering the hot water. The portable coffee drinking container 200 may be a new-concept tumbler in which a dripper and a drinking container are implemented.

That is, the portable coffee drinking container 200 is a container that enables drinking the drip coffee DC made by pouring water onto the coffee grounds P. The portable coffee drinking container 200 may include a first main body 210, a second main body 220, a cover 230, a first opening and closing part 240, a filter 260, and the like.

The first main body 210 may provide a first space S1 for dripping in which coffee grounds P are stored, and may include an outlet hole H1 through which the drip coffee DC made by dripping discharges into a second space S2.

The second main body 220 may provide the second space S2, and may include an inlet hole H2 through which the drip coffee DC discharging through the outlet hole H1 flows into the second space S2.

The outlet hole H1 may be formed at the bottom surface of the first main body 210, and the inlet hole H2 may be formed at the top surface of the second main body 220.

The first main body 210 and the second main body 220 may be surrounded by the cover 230. In other words, the first main body 210 and the second main body 220 may be placed inside the cover 230.

The cover 230 may serve as an external appearance of the portable coffee drinking container 200, and may be an element with which the first opening and closing part 240 is detachably engaged.

Herein, the specific configuration of the first opening and closing part 240, and the principle that the communication between the outlet hole H1 and the inlet hole H2 is cut off when the first opening and closing part 240 is engaged with the cover 230 have been described with reference to FIGS. 1 to 9, and thus detailed descriptions thereof will be omitted.

In the meantime, the portable coffee drinking container 200 may include a drinking part 280 that enables drinking the drip coffee stored in the second space S2.

The drinking part 280 may be detachably engaged with the second main body 220 in a screw-type fastening manner, but no limitation thereto is imposed. The drinking part 280 may be engaged with the second main body 220 in a forcibly interlocking manner.

The drinking part 280 may include: a drinking hole 282 through which the drip coffee flowing into the second space S2 discharges to the outside for drinking; and a vent hole 284 for adjusting pressure so that the drip coffee discharges through the drinking hole 282.

The opening and the closing of the drinking hole 282 and the vent hole 284 may be adjusted by a drinking adjusting part 290 detachably engaged with the drinking part 280.

When the drinking adjusting part 290 is inserted into the drinking part 280, the drinking adjusting part 290 is in close contact with the drinking hole 282 and the vent hole 284. Thus, the drinking hole 282 and the vent hole 284 may be closed.

Specifically, the drinking adjusting part 290 may include: a close-contact part 292 that closes the drinking hole 282 and the vent hole 284 by being in close contact with the drinking hole 282 and the vent hole 284; and a support 294 supporting the close-contact part 292.

The close-contact part 292 may be made of a rubber material having elasticity, and may have a portion that corresponds to the drinking hole 282 and the vent hole 284 and is formed in multiple layers.

Herein, the portion of the close-contact part 292 may be formed in the multiple layers spaced apart from each other.

Therefore, when the drinking adjusting part 290 is inserted into the drinking part 280, the drinking hole 282 and the vent hole 284 are stably closed due to the close-contact part 292 having the portion formed in the multiple spaced layers.

In the meantime, the drinking adjusting part 290 may be interlocked with the second opening and closing part 295 that is detachably engaged with the drinking part 280 in a screw-type fastening manner, or the like.

The drinking adjusting part 290 may keep connected with the second opening and closing part 295. To this end, the second opening and closing part 295 and the drinking adjusting part 290 may include a locking portion 296 and a locked portion 297, respectively.

The locking portion 296 and the locked portion 297 may be implemented as a groove and a protruding structure inserted into the groove, and vice versa. Other known means for connection may be applicable.

Accordingly, when the second opening and closing part 295 is engaged with the drinking part 280 in a screw-type fastening manner, or the like, the drinking adjusting part 290 is inserted into the drinking part 280 and naturally closes the drinking hole 282 and the vent hole 284.

Herein, when the second opening and closing part 295 is fastened to the drinking part 280 in a screwing manner, the drinking adjusting part 290 also rotates with the second opening and closing part 295 simultaneously. This is because a protrusion 291 formed at the support 294 is inserted into a depression 293 formed at the second opening and closing part 295.

Hereinafter, a method of using the portable coffee drinking container 200 according to another embodiment of the present invention will be described in detail with reference to FIGS. 16 to 20.

FIGS. 16 to 20 are schematic cross-sectional views showing a method of using a portable coffee drinking container according to another embodiment of the present invention.

Figure 16:
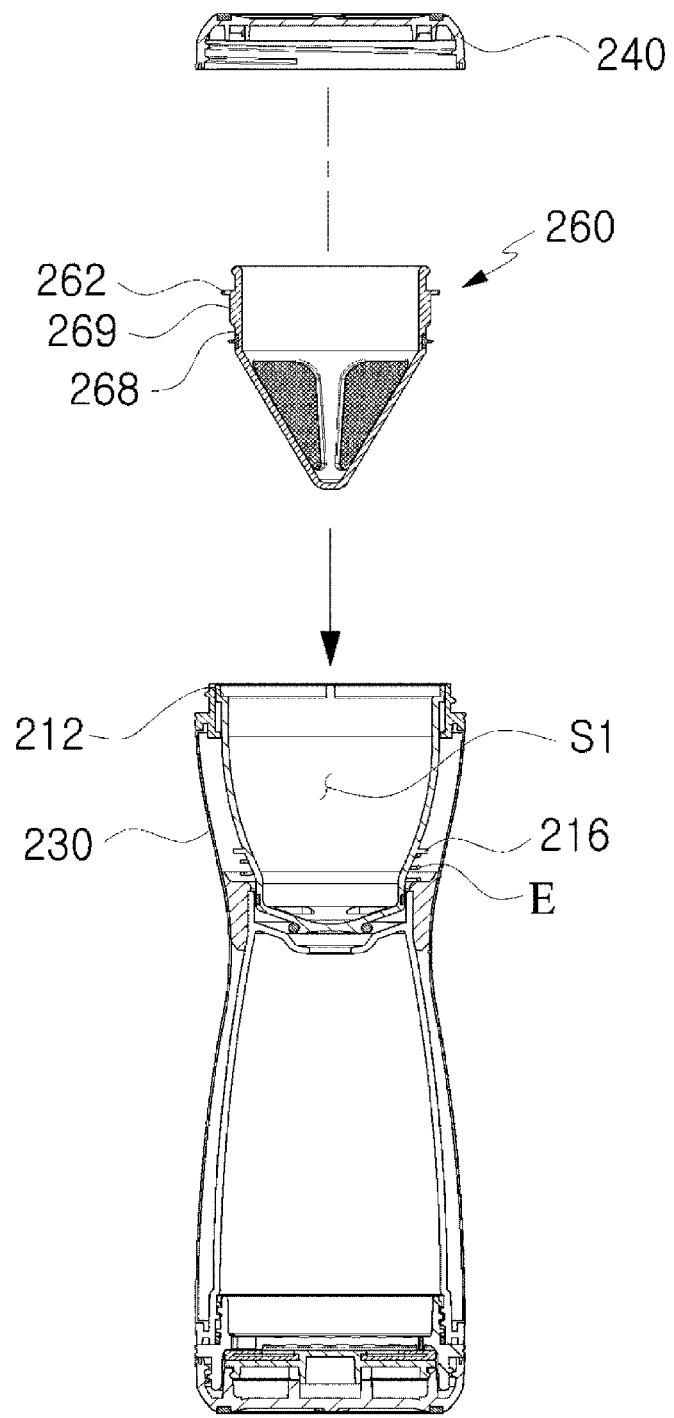
FIGS. 16 to 20 are schematic cross-sectional views showing a method of using a portable coffee drinking container according to another embodiment of the present invention.

Referring to FIG. 16, to make drip coffee, the first opening and closing part 240 is detached from the cover 230, and the filter 260 is inserted into the first space S1 provided by the first main body 210.

However, when the filter 260 is already placed in the first space S1 before the first opening and closing part 240 is detached from the cover 230, the step of inserting the filter 260 may be omitted.

The seated portion 262 is seated on the stepped portion 212 formed at the inner surface of the first main body 210, so that the filter 260 is positioned at a predetermined position within the first space S1. By the anti-eccentricity part 269 protruding from the outer surface of the anti-inflow part 268, the filter 260 is prevented from being placed eccentrically within the first space S1.

Referring to FIG. 15, the filter 260 is inserted into the first space S1, and the seated portion 262 is seated on the stepped portion 212. Then, an appropriate amount of coffee grounds P is inserted into the filter 260, and hot water W is poured onto the coffee grounds P.

Herein, the outlet hole H1 and the inlet hole H2 may be in communication with each other, because the first opening and closing part 240 is detached from the cover 230. As time passes, the drip coffee DC is stored in the second space S2 provided by the second main body 220.

When the dripping process is completed, the communication between the outlet hole H1 and the inlet hole H2 is cut off, and then the drip coffee stored in the second space S2 can be drunk.

Figure 18:
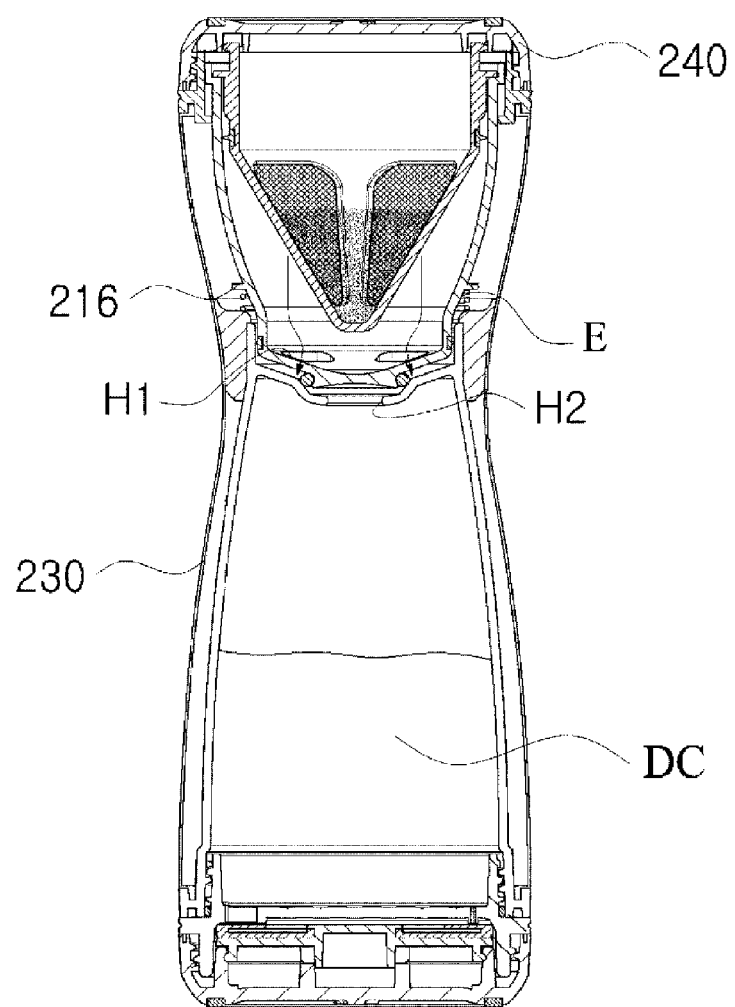

Herein, in order to cut off the communication between the outlet hole H1 and the inlet hole H2, the first opening and closing part 240 is rotated and engaged with the cover 230 as shown in FIG. 18.

When the first opening and closing part 240 is engaged with the cover 230, the communication between the outlet hole H1 and the inlet hole H2 is cut off due to the interaction between the first opening and closing part 240 and the cover 230.

The principle that the communication between the outlet hole H1 and the inlet hole H2 is cut off when the first opening and closing part 240 is engaged with the cover 230 has been described with reference to FIGS. 1 to 9, and thus a detailed description thereof will be omitted.

Figure 19:
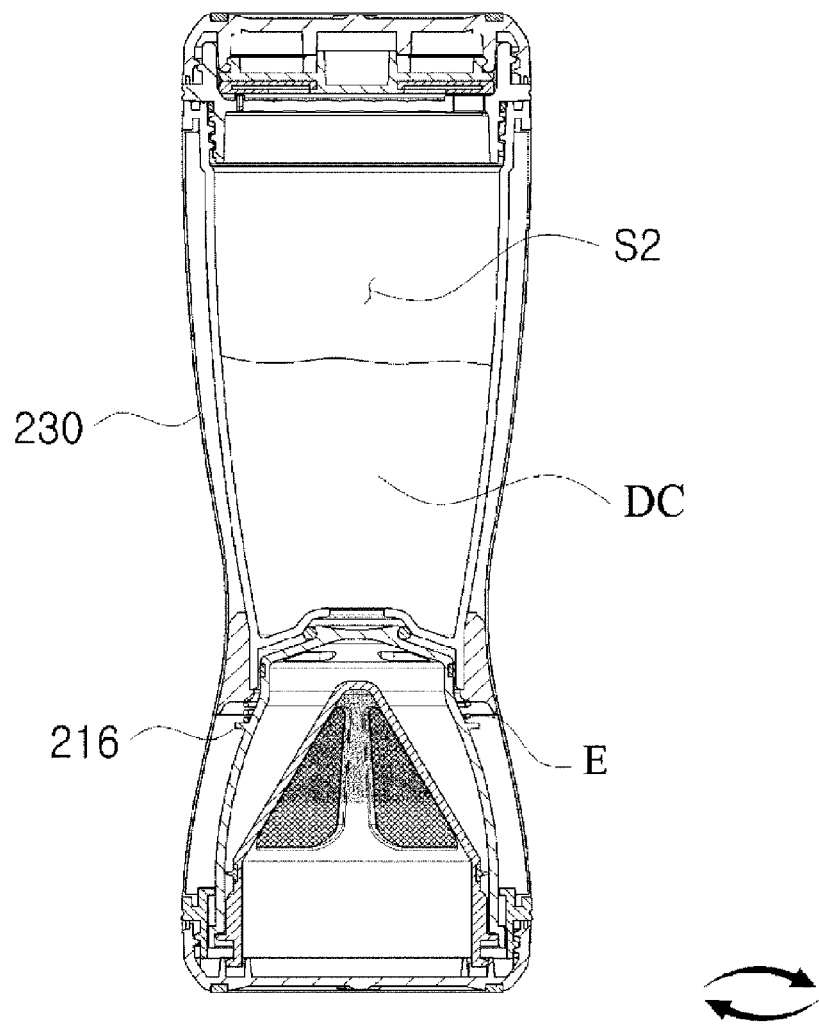

When the first opening and closing part 240 is engaged with the cover 230 and the communication between the outlet hole H1 and the inlet hole H2 is cut off, the cover 230 is rotated to interchange the position of the first main body 210 and the position of the second main body 220, as shown in FIG. 19.

That is, the cover 230 enables the first main body 210 to be positioned in the direction of gravity from the second main body 220, so that the drip coffee flowing into the second space S2 can be drunk.

Herein, due to the restoring force of the elastic part E to which pressure is applied by the first opening and closing part 240, the first ring member 242 is in close contact with the top end of the filter, and the second ring member 244 is in close contact with the top end of the cover 230 or the top end of the first main body 210, thereby resulting in a sealing state and preventing leakage of the liquid.

When the first main body 210 is positioned in the direction of gravity from the second main body 220, the user detaches the second opening and closing part 295 from the drinking part 280 and drinks the drip coffee DC through the drinking hole 282.

Figure 20:
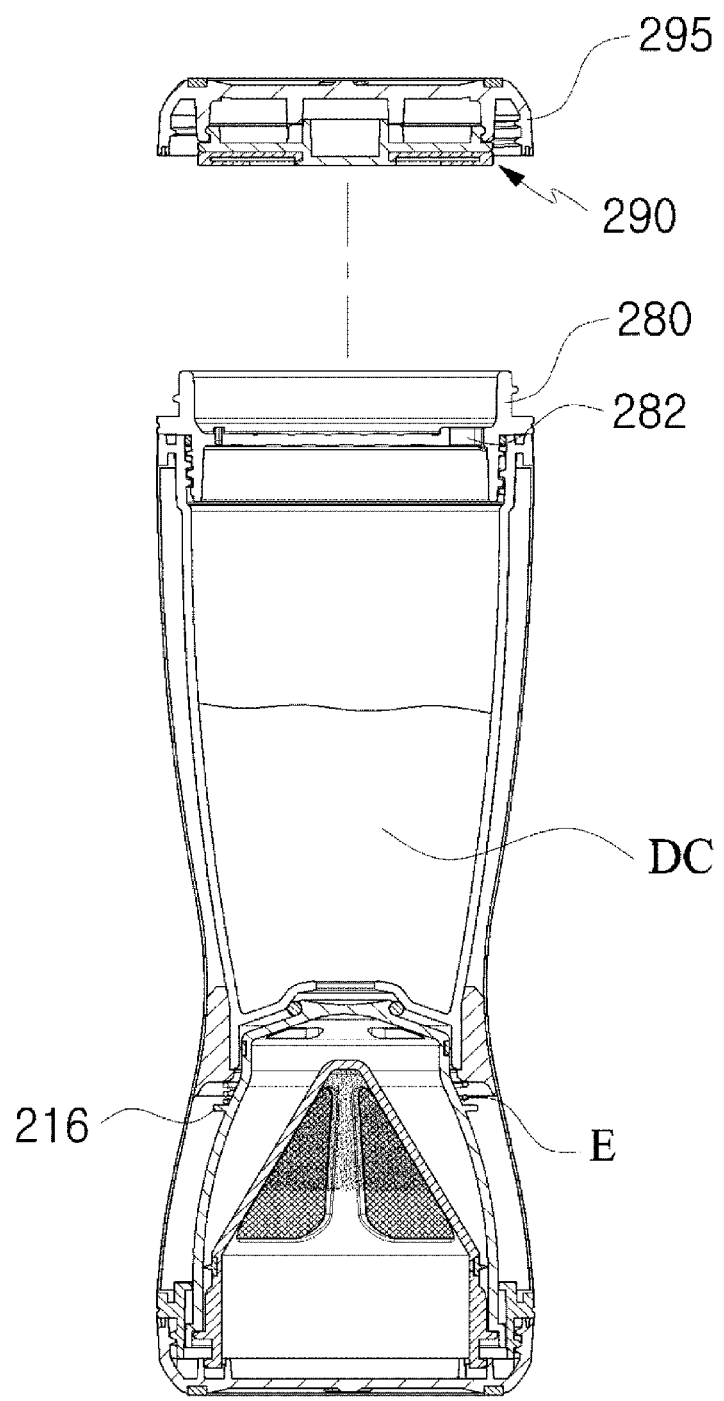

Herein, as shown in FIG. 20, the drinking adjusting part 290 is naturally detached from the drinking part 280 when the second opening and closing part 295 is detached from the drinking part 280.

While the present invention has been described with reference to exemplary embodiments thereof, but is not limited thereto. It is apparent to those skilled in the art that various changes and modifications thereof may be made within the spirit and scope of the present invention, and therefore to be understood that such changes and modifications belong to the appended claims.

DESCRIPTION OF THE REFERENCE NUMERALS IN THE DRAWINGS

100: Drip container
200: Portable coffee drinking container
110, 210: First main body
220: Second main body
130, 230: Cover
140, 240: First opening and closing part
160, 260: Filter 295: Second opening and closing part
113: Stepped wall
116, 216: Outward protrusion
133: Anti-leakage end
135: Elastic-part support
142: First ring member
144: Second ring member
163: Anti-leakage ring
E: Elastic part

The invention claimed is:

1. A drip container comprising:
a first main body providing a first space for dripping in which coffee grounds are stored, including an outlet hole through which drip coffee made by dripping discharges into a second space, and including an outward protrusion that protrudes outward from a region of an outer wall defining the first space;
a cover surrounding the first main body so that the first main body is protected;
a first opening and closing part detachably engaged with the cover so that opening and closing of the first space are adjusted;
an inflow part including an inlet hole through which the drip coffee discharging through the outlet hole flows into the second space; and
an elastic part elastically deformed due to pressure applied by the outward protrusion when the first opening and closing part is engaged, and placed between the first main body and the cover so that restoring force acts on the outward protrusion, wherein a position of the first main body is changed by interaction between the first opening and closing part and the elastic part, thereby adjusting communication between the outlet hole and the inlet hole
when the first opening and closing part is engaged with the cover, the outward protrusion applies pressure to the elastic part and a distance between facing surfaces of the first main body and the inflow part is thus reduced, thereby cutting off the communication between the outlet hole and the inlet hole, and
when the first opening and closing part is detached from the cover, the elastic part applies the restoring force to the outward protrusion so as to return the first main body to its original position, thereby implementing the communication between the outlet hole and the inlet hole.

2. The drip container of claim 1, wherein a predetermined region at a lower portion of the first main body is smaller in diameter than an upper portion of the first main body,
the outward protrusion is positioned at the predetermined region, and
the elastic part is positioned in a space between the first main body and the cover, the space being ensured because the diameter of the predetermined region is smaller than the diameter of the upper portion of the first main body.

3. The drip container of claim 1, further comprising:
a filter including a filter net to enable dripping when placed in the first space, and including an anti-leakage ring that extends in a protruding manner upward from an upper portion of the filter,
wherein the first opening and closing part includes a first ring member that is in contact with the anti-leakage ring to make an inner space of the filter airtight when the first opening and closing part is engaged with the cover.

4. The drip container of claim 1, wherein the cover includes an anti-leakage end that extends in a protruding manner upward from a top end of the cover which is engaged with the first opening and closing part, and
the first opening and closing part includes a second ring member that is in contact with the anti-leakage end to make an inner space of the cover airtight when the first opening and closing part is engaged with the cover.

5. The drip container of claim 1, further comprising:
a closing part placed proximate to at least one of facing surfaces of the first main body and the inflow part,
wherein when the first opening and closing part is engaged with the cover, the closing part is in contact with both of the facing surfaces of the first main body and the inflow part and thus cuts off the communication between the outlet hole and the inlet hole.

6. A portable coffee drinking container comprising:
a first main body providing a first space for dripping in which coffee grounds are stored, including an outlet hole through which drip coffee made by dripping discharges into a second space, and including an outward protrusion that protrudes outward from a region of an outer wall defining the first space;
a second main body providing the second space, and including an inlet hole through which the drip coffee discharging through the outlet hole flows into the second space;
a cover surrounding the first main body and the second main body so that the first main body and the second main body are placed inside the cover;
a first opening and closing part detachably engaged with the cover so that opening and closing of the first space in which the coffee grounds are stored are adjusted; and
an elastic part elastically deformed due to pressure applied by the outward protrusion when the first opening and closing part is engaged, and placed between the first main body and the cover so that restoring force acts on the outward protrusion, wherein a position of the first main body is changed by interaction between the first opening and closing part and the elastic part, thereby adjusting communication between the outlet hole and the inlet hole,
the first opening and closing part is detached from the cover so that the drip coffee flows into the second space through the outlet hole and the inlet hole, and then the first opening and closing part is engaged with the cover so that the communication between the outlet hole and the inlet hole is cut off,
the cover enables the first main body to be positioned in a direction of gravity from the second main body, so that the drip coffee flowing into the second space can be drunk,
when the first opening and closing part is engaged with the cover, the outward protrusion applies pressure to the elastic part and a distance between facing surfaces of the first main body and the inlet hole is thus reduced, thereby cutting off the communication between the outlet hole and the inlet hole, and
when the first opening and closing part is detached from the cover, the elastic part applies the restoring force to the outward protrusion, thereby returning the first main body to its original position.

7. The portable coffee drinking container of claim 6, wherein a predetermined region at a first side of the first main body is smaller in diameter than a second side of the first main body which is positioned in a direction pointing away from the second main body with respect to the predetermined region,
  the outward protrusion is positioned at the predetermined region, and
  the elastic part is positioned in a space between the first main body and the cover, the space being ensured because the diameter of the predetermined region is smaller than the diameter of the second side.

8. The portable coffee drinking container of claim 6, further comprising:
  a filter including a filter net to enable dripping when placed in the first space, and including an anti-leakage ring that extends in a protruding manner from a first side of the filter in a direction pointing away from the second main body,
  wherein the first opening and closing part includes a first ring member that is in contact with the anti-leakage ring to make an inner space of the filter airtight when the first opening and closing part is engaged with the cover.

9. The portable coffee drinking container of claim 6, wherein the cover includes an anti-leakage end that extends in a protruding manner from a first side of the cover which is engaged with the first opening and closing part, in a direction pointing away from the second main body, and
  the first opening and closing part includes a second ring member that is in contact with the anti-leakage end to make an inner space of the cover airtight when the first opening and closing part is engaged with the cover.

10. The portable coffee drinking container of claim 6, further comprising:
  a closing part placed at at least one of facing surfaces of the first main body and the second main body,
  wherein the closing part is in contact with both of the facing surfaces of the first main body and the second main body due to pressure applied by the first opening and closing part, and thus cuts off the communication between the outlet hole and the inlet hole.

11. The portable coffee drinking container of claim 6, further comprising:
  a drinking part detachably engaged with the second main body, and including a drinking hole through which the drip coffee flowing into the second space discharges to outside for drinking, and a vent hole for adjusting pressure so that the drip coffee discharges through the drinking hole; and
  a drinking adjusting part detachably engaged with the drinking part to adjust opening and closing of the drinking hole and the vent hole.

12. The portable coffee drinking container of claim 11, wherein the drinking adjusting part includes a close-contact part that is in close contact with the drinking hole and the vent hole and thus closes the drinking hole and the vent hole when the drinking adjusting part is inserted into the drinking part, and
  the close-contact part has elasticity, and has a portion that corresponds to the drinking hole and the vent hole and is formed in multiple layers.

13. The portable coffee drinking container of claim 12, wherein the portion of the close-contact part is formed in the multiple layers spaced apart from each other.

* * * * *